United States Patent
Levinson et al.

(10) Patent No.: US 7,257,328 B2
(45) Date of Patent: Aug. 14, 2007

(54) SYSTEM AND METHOD FOR TRANSMITTING DATA ON RETURN PATH OF A CABLE TELEVISION SYSTEM

(75) Inventors: Frank H. Levinson, Palo Alto, CA (US); Gerald F. Sage, Chico, CA (US); Arthur Michael Lawson, Morgan Hill, CA (US); Willem A. Mostert, Issaquah, WA (US)

(73) Assignee: Finisar Corporation, Sunnyvale, CA (US)

(*) Notice: Subject to any disclaimer, the term of this patent is extended or adjusted under 35 U.S.C. 154(b) by 1241 days.

(21) Appl. No.: 09/735,710

(22) Filed: Dec. 12, 2000

(65) Prior Publication Data

US 2002/0129379 A1    Sep. 12, 2002

Related U.S. Application Data

(60) Provisional application No. 60/170,413, filed on Dec. 13, 1999.

(51) Int. Cl.
*H04B 10/04* (2006.01)
(52) U.S. Cl. ....................................... 398/182
(58) Field of Classification Search ............... 370/436, 370/535, 480, 489, 537; 725/129, 143, 147, 725/148, 144, 119; 375/295; 398/182
See application file for complete search history.

(56) References Cited

U.S. PATENT DOCUMENTS

| | | | | |
|---|---|---|---|---|
| 4,862,392 A | * | 8/1989 | Steiner | ........................ 345/427 |
| 5,036,315 A | * | 7/1991 | Gurley | ........................ 715/733 |
| 5,155,590 A | | 10/1992 | Beyers, II et al. | ............ 358/86 |
| 5,225,902 A | | 7/1993 | McMullan, Jr. | ............... 358/86 |

(Continued)

FOREIGN PATENT DOCUMENTS

WO    WO00/25459    5/2000

(Continued)

*Primary Examiner*—Jason Chan
*Assistant Examiner*—Quan-Zhen Wang
(74) *Attorney, Agent, or Firm*—Workman Nydegger

(57) ABSTRACT

An optical signal return path system includes a transmitter having a sample clock generator for generating a sample clock and an RF signal receiver for receiving and converting an analog RF data signal into a first data stream of digitized RF data samples at a rate determined by the sample clock. Supplemental channel circuitry provides a second data stream. A multiplexor receives and combines the first data stream and second data stream, and an optical transmitter converting the combined data stream into a serialized optical data signal for transmission over an optical fiber. The second data stream may contain maintenance data reflecting an operational state of the transmitter. A receiver receives the optical data signal and recovers therefrom a digital data stream and an associated first clock having an associated first clock rate. The data stream is stored in a memory device at the first clock rate. A clock generator generates a second clock having an associated second clock rate that is adjusted in accordance with a clock control signal. A control circuit reads data from the memory device at a rate corresponding to the second clock rate and generates a fullness signal that indicates whether the memory device is more full than a predefined threshold fullness level. A clock speed adjusting circuit generates the clock control signal in accordance with the fullness signal.

27 Claims, 23 Drawing Sheets

U.S. PATENT DOCUMENTS

| | | | |
|---|---|---|---|
| 5,247,364 A | 9/1993 | Banker et al. | 358/191.1 |
| 5,301,028 A | 4/1994 | Banker et al. | 348/570 |
| 5,317,391 A | 5/1994 | Banker et al. | 348/6 |
| 5,357,276 A | 10/1994 | Banker et al. | 348/7 |
| 5,430,568 A | 7/1995 | Little et al. | 359/124 |
| 5,442,472 A | 8/1995 | Skrobko | 359/110 |
| 5,497,187 A | 3/1996 | Banker et al. | 348/6 |
| 5,499,241 A | 3/1996 | Thompson et al. | 370/73 |
| 5,539,822 A | 7/1996 | Lett | 380/20 |
| 5,581,555 A | 12/1996 | Dubberly et al. | 370/487 |
| 5,594,726 A | 1/1997 | Thompson et al. | 370/485 |
| 5,684,799 A * | 11/1997 | Bigham et al. | 370/397 |
| 5,719,867 A | 2/1998 | Borazjani | 370/436 |
| 5,719,872 A | 2/1998 | Dubberly et al. | 370/487 |
| 5,794,117 A | 8/1998 | Benard | |
| 5,826,167 A | 10/1998 | Jelinek et al. | 455/5.1 |
| 5,854,703 A | 12/1998 | West, Jr. | 359/167 |
| 5,926,478 A * | 7/1999 | Ghaibeh et al. | 370/395.51 |
| 5,930,231 A | 7/1999 | Miller et al. | 370/210 |
| 5,963,352 A | 10/1999 | Atlas et al. | 359/161 |
| 6,161,011 A | 12/2000 | Loveless | 455/426 |
| 6,272,150 B1 | 8/2001 | Hrastar et al. | 370/486 |
| 6,356,369 B1 | 3/2002 | Farhan | 359/125 |
| 6,356,374 B1 | 3/2002 | Farhan | 359/180 |
| 6,373,611 B1 * | 4/2002 | Farhan et al. | 398/182 |
| 6,417,949 B1 | 7/2002 | Farhan et al. | 359/173 |
| 6,433,906 B1 | 8/2002 | Farhan | 359/167 |
| 6,437,895 B1 | 8/2002 | Farhan et al. | 359/180 |
| 6,449,071 B1 | 9/2002 | Farhan et al. | 359/125 |
| 6,457,178 B1 | 9/2002 | Slim | 725/127 |
| 6,462,851 B1 | 10/2002 | West, Jr. | 359/173 |
| 6,519,067 B2 | 2/2003 | Farhan et al. | 359/180 |
| 6,523,177 B1 | 2/2003 | Brown | 725/121 |
| 6,535,715 B2 * | 3/2003 | Dapper et al. | 455/3.05 |

FOREIGN PATENT DOCUMENTS

| | | |
|---|---|---|
| WO | 0143441 | 6/2001 |

* cited by examiner

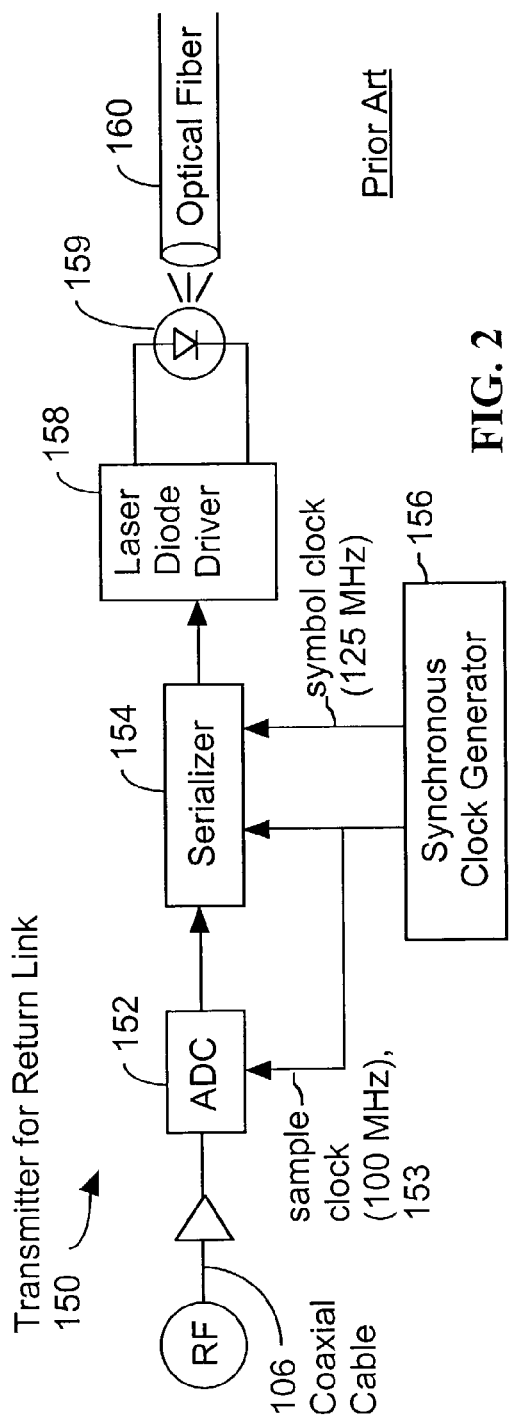
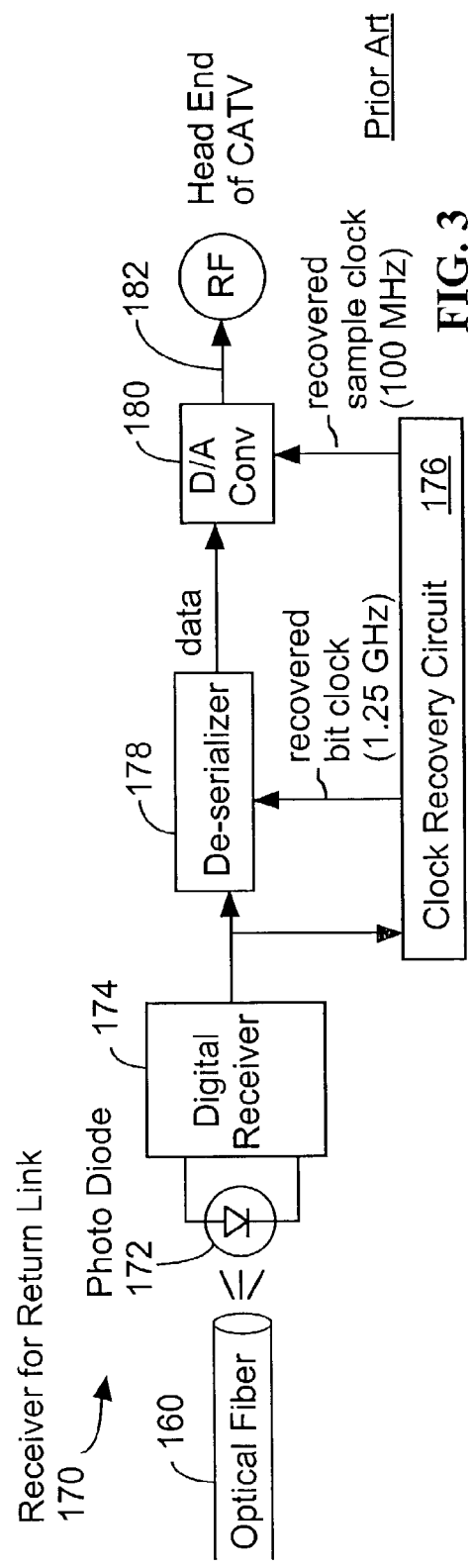

State Diagram for Dual Channel Receiver Demultiplexor

SYSTEM AND METHOD FOR TRANSMITTING DATA ON RETURN PATH OF A CABLE TELEVISION SYSTEM

CROSS-REFERENCE TO RELATED APPLICATIONS

This application claims the benefit of U.S. Provisional Application No. 60/170,413, filed on Dec. 13, 1999.

FIELD OF INVENTION

The present invention relates generally to upstream data communications over networks primarily designed for downstream transmission of television and data signals, and particularly to a system and method for converting one or more analog signals into digital signals, transmitting them over optical media, and then accurately regenerating the one or more analog signals.

BACKGROUND OF THE INVENTION

Basic CATV System Architecture. Cable television systems (CATV) were initially deployed so that remotely located communities were allowed to place a receiver on a hilltop and then use coaxial cable and amplifiers to distribute received signals down to the town which otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path". A good review of much of today's existing return path technology is contained in the book entitled *Return Systems for Hybrid Fiber Coax Cable TV Networks* by Donald Raskin and Dean Stoneback, hereby incorporated by reference as background information.

One additional innovation has become pervasive throughout the CATV industry over the past 10 years. That is the introduction of analog optical fiber transmitters and receivers operating over single mode optical fiber. These optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to distribute signals from the neighborhood nodes to homes, businesses and the like in a small geographical area. Return path optical fibers are typically located in the same cable as the forward path optical fibers so that return signals can have the same advantages as the forward path.

HFC provides several benefits. Using fiber for at least part of the signal transmission path makes the resulting system both more reliable and improves signal quality. Failures in the hybrid systems are often less catastrophic than in traditional tree and branch coaxial systems because most failures affect only a single sub-tree or neighborhood.

CATV return paths have become much more important over the past few years because of their ability to carry data signals from homes, businesses and other user locations back to the head end and thereby enable Internet traffic to flow in and out of the home at data rates much higher than is possible with normal telephone modems. Speeds for these so-called cable modem based systems are typically around 1 Mb/s or greater as opposed to the 28.8 Kb/s to 56 Kb/s rates associated with telephone based data transmission. CATV based Internet access is typically sold on a monthly basis without time based usage charges, thus enabling people to be connected to the Internet 24 hours per day, 7 days a week.

With the advent of these advanced services, there also arose numerous problems with using a physical CATV plant designed to transmit video signals from town council meetings (using the forward path) to provide high-speed Internet access for hundreds, if not thousands, of users simultaneously (using both the forward and return path). These problems are generally related to the return path link, which are described in detail below.

The Aggregation Problem. Economically, the main problem that exists for CATV return path technology is that the return path signals need to be aggregated; which means the signals from many users are summed into a combined signal. The combined signal is then processed by equipment at the head end. Return signals are summed because processing the return path signals from their multi-frequency radio frequency (RF) format to digital packets ready for the Internet requires the use of an expensive device called a CMTS (cable modem termination system). This equipment is so expensive that it cannot be cost justified today on the basis of processing only one or even a couple of return signals. By aggregating the return signals of many users, the high cost of CMTS's is spread over enough users to make their use economically feasible.

Aggregation is also important because it allows for efficient use of optical fibers. Most HFC systems provide only a small number of optical fibers for each neighborhood, and thus these systems do not have enough optical fibers to provide a separate optical fiber for each return signal. Aggregation allows numerous return signals to be placed onto and transmitted by a single optical fiber, making efficient use of the existing fiber plant.

Aggregation, when done by simply combining various RF level signals from the return signals of individual users, results in a degradation of the signal to noise ratio (SNR) for the system. SNR must be kept above a certain level in order for the RF signals received at the head end to be reliably processed into digital data that is error free.

The Ingress Problem. A problem known as "ingress" is often made much worse by the aggregation of many RF signals. The term "ingress" refers to the injection of noise into the return path signals. The noise signals typically injected into the return paths of CATV systems are of unpredictable frequency and strength. In the forward path, all signals originate at the head end and this single location is controlled and therefore is able to be well managed so as to minimize the injection of noise. On the other hand, the return path has many points of input (typically one or more per home or business) and the return path operates by aggregating all of the inputs from a geographical area onto a single coaxial cable. For example, consider a system in which there are a hundred users coupled to a single coaxial cable. Ninety-nine of the users may be submitting valid Internet traffic (i.e., return path signals) through their cable modems, with low levels of associated noise, while one user may have faulty wiring that causes the noise associated with an amateur radio transmitter or television or personal computer to be coupled into the return path. This is ingress and it can result in the loss of data for the other ninety-nine well-behaved users!

The summing or aggregation process applies to ingress as well. So it is not necessary that any single point of ingress be the one causing system failure, but rather it is possible that several different subscribers may be sources of some portion of the noise that degrades the signal to noise ratio (SNR) of the system.

The Link Degradation Problem. Analog optical fiber return path links suffer from another problem. The links degrade with distance and connector problems. This is due to reflections from imperfections at connector and splice interfaces and back scattering in the optical fiber over distance. Connector and splice problems can cause a degradation in the laser relative intensity noise (RIN), and all of these phenomena, including back scattering, cause light arriving at the receiver to have traveled different distances down the fiber and hence some of the arriving light can be out of phase with the transmitted RF signal. In all cases, the SNR of the link degrades with distance, as noted in *Return Systems for Hybrid Fiber Coax Cable TV Networks*. Link degradation also can occur from the substantial temperature swings associated with the outdoor environment through which return path links travel, as well as rough handling of the return path link equipment by installers, for example during the installation of equipment at the top of poles.

Prior Art Analog Return Path Link

FIG. 1 is a block diagram of a prior art cable television system 100 that uses conventional analog return path optical fiber links. The system in FIG. 1 conforms generally to 1999 industry standards, and is susceptible to the ingress and link degradation problems described above. Each subtree 102 of the system consists of a coaxial cable 106 that is coupled to cable modems 108 used by subscribers for Internet access. The coaxial cable 106 is also coupled to set top boxes and other equipment not relevant to the present discussion. The coaxial cable 106 of each subtree 102 is coupled to at least one forward path optical fiber 110 and at least one return path optical fiber 112. Additional optical fibers (not shown) may be used for the forward path transmission of television programming. An analog optoelectronic transceiver 114 provides the data path coupling the coaxial cable 106 to the optical fibers 110, 112.

An RF input signal, having an associated signal level, is submitted to a transmitter portion of the optoelectronic transceiver 114, which in turn gains or attenuates the signal level depending on how it is set up. Then, the input signal is amplitude modulated and converted into an amplitude modulated optical signal by a laser diode 122. Both fabre-perot (FP) and distributed feedback (DFB) lasers can be used for this application. DFB lasers are used in conjunction with an optical isolator and have improved signal to noise over FP lasers, but at a sacrifice of substantial cost. DFB lasers are preferred, as the improved SNR allows for better system performance when aggregating multiple returns.

The laser output light from the laser diode 122 is coupled to a single mode optical fiber (i.e., the return path optical fiber 112) that carries the signal to an optical receiver 130, typically located at the head end system 132. The optical receiver 130 converts the amplitude modulated light signal back to an RF signal. Sometimes a manual output amplitude adjustment mechanism is provided to adjust the signal level of the output produced by the optical receiver. A cable modem termination system (CMTS) 134 at the head end 132 receives and demodulates the recovered RF signals so as to recover the return path data signals sent by the subscribers.

Prior Art Digital Return Path Link

FIGS. 2 and 3 depict the transmitter 150 and receiver 170 of a prior art return path link. The transmitter 150 digitizes the RF signal received from the coaxial cable 106, using an analog to digital converter (ADC) 152. The ADC 152 generates a ten-bit sample value for each cycle of the receiver's sample clock 153, which is generated by a local, low noise clock generator 156. The output from the ADC 152 is converted by a serializer 154 into a serial data stream. The serializer 154 encodes the data using a standard 8B/10B mapping (i.e., a bit value balancing mapping), which increases the amount of data to be transmitted by twenty-five percent. This encoding is not tied to the 10-bit boundaries of the sample values, but rather is tied to the boundary of each set of eight samples (80 bits), which are encoded using 100 bits.

When the sample clock operates at a rate of 100 MHz, the output section of the serializer 154 is driven by a 125 MHZ symbol clock, and outputs data bits to a fiber optic transmitter 158, 159 at a rate of 1.25 Gb/s. The fiber optic transmitter 158, 159 converts electrical 1 and 0 bits into optical 1 and 0 bits, which are then transmitted over an optical fiber 160. The fiber optic transmitter includes a laser diode driver 158 and a laser diode 159.

The receiver 170 at the receive end of the optical fiber 160 includes a fiber receiver 172, 174 that receives the optical 1 and 0 bits transmitted over the optical fiber 160 and converts them back into the corresponding electrical 1 and 0 bits. This serial bit stream is conveyed to a deserializer circuit 178. A clock recovery circuit 176 recovers a 1.25 GHz bit clock from the incoming data and also generates a 100 MHz clock that is synchronized with the recovered 1.25 GHz bit clock.

The recovered 1.25 GHz bit clock is used by the deserializer 178 to clock in the received data, and the 100 MHz clock is used to drive a digital to analog converter 180, which converts ten-bit data values into analog voltage signals on node 182 of the head end system. As a result, the RF signal from the coaxial cable 106 is regenerated on node 182 of the head end system.

Prior art return path link systems, such as the one shown in FIGS. 2 and 3, have used a low noise oscillator at the transmitter for the A/D sample clock. The same oscillator is also used as a reference for a synthesizer that generates a coherent symbol clock for the communications link. The receiver 170 recovers the symbol clock.

Time jitter is introduced in the receiver sample clock by the communications path. The receiver's clock recovery circuit must react quickly to maintain lock on the received data. The receiver's clock recovery circuit also responds quickly to noise, resulting in a noisy reference for the synthesizer (in clock recovery circuit 176) which generates the recovered sample clock. Due to the inflexible, synchronous relationship between the recovered sample clock and the recovered symbol (bit) clock, jitter in the recovered symbol clock is also present in the recovered sample clock.

Another shortcoming of the prior art return path link systems is inefficient use of the fiber optic links. In particular, as discussed above, each prior art return path link transmits data stream from only one RF data channel.

SUMMARY OF THE INVENTION

The present invention provides a new return path apparatus and return path signal transmission method that avoids or substantially reduces the aggregation, ingress and/or link degradation related problems currently found in return path links. Further, the return path apparatus of the present invention also provides efficient use of the optical fiber links by transmitting data from more than one RF data channel.

In particular, the present invention is a return path link for transmitting data from subscribers using cable modems on a cable television network to a head end system. The data transmitted by a group of the subscribers is initially coupled onto one or more coaxial cables as analog RF signals. One or more analog to digital converters (ADC) convert the analog signals into digital signals. The analog to digital converters operate at a first sampling clock rate generated by a low noise oscillator. Transmitter signal handling logic converts the digital signals produced by the ADCs into a sequence of digitally encoded data frames. Subsequently, a laser transmitter transmits the data frames, along with control signals, onto one end of an optical fiber at a second clock rate.

A receiver at the other end of the optical receives the data frames, along with the control signals. A clock recovery circuit coupled to the receiver recovers the received data frames and also recovers a first clock signal having a clock rate substantially equal to the second clock rate. Receiver signal handling logic converts the received data frames into recovered data and stores the recovered data in a buffer. The buffer has associated therewith circuitry for determining whether the fullness of the buffer is more or less than a threshold level, such as half full. Based on this information, the signal rate of a precision controlled oscillator is adjusted. The second clock signal, generated by the precision controlled oscillator, has a clock rate substantially equal to the first, sampling clock rate. A digital to analog converter, operating at a rate set by the second clock signal, converts the recovered data stored in the memory into one or more recovered analog signals.

BRIEF DESCRIPTION OF THE DRAWINGS

Additional objects and features of the invention will be more readily apparent from the following detailed description and appended claims when taken in conjunction with the drawings, in which:

FIGS. 2 and 3 are block diagrams of the transmitter and receiver, respectively, of a prior art digital return path link system;

FIGS. 6A, 6B and 6C are illustrations depicting three modes of inserting ancillary data between data frames;

DESCRIPTION OF THE PREFERRED EMBODIMENTS

Return Path Dual RF Signal Transmitter

Figure 1:
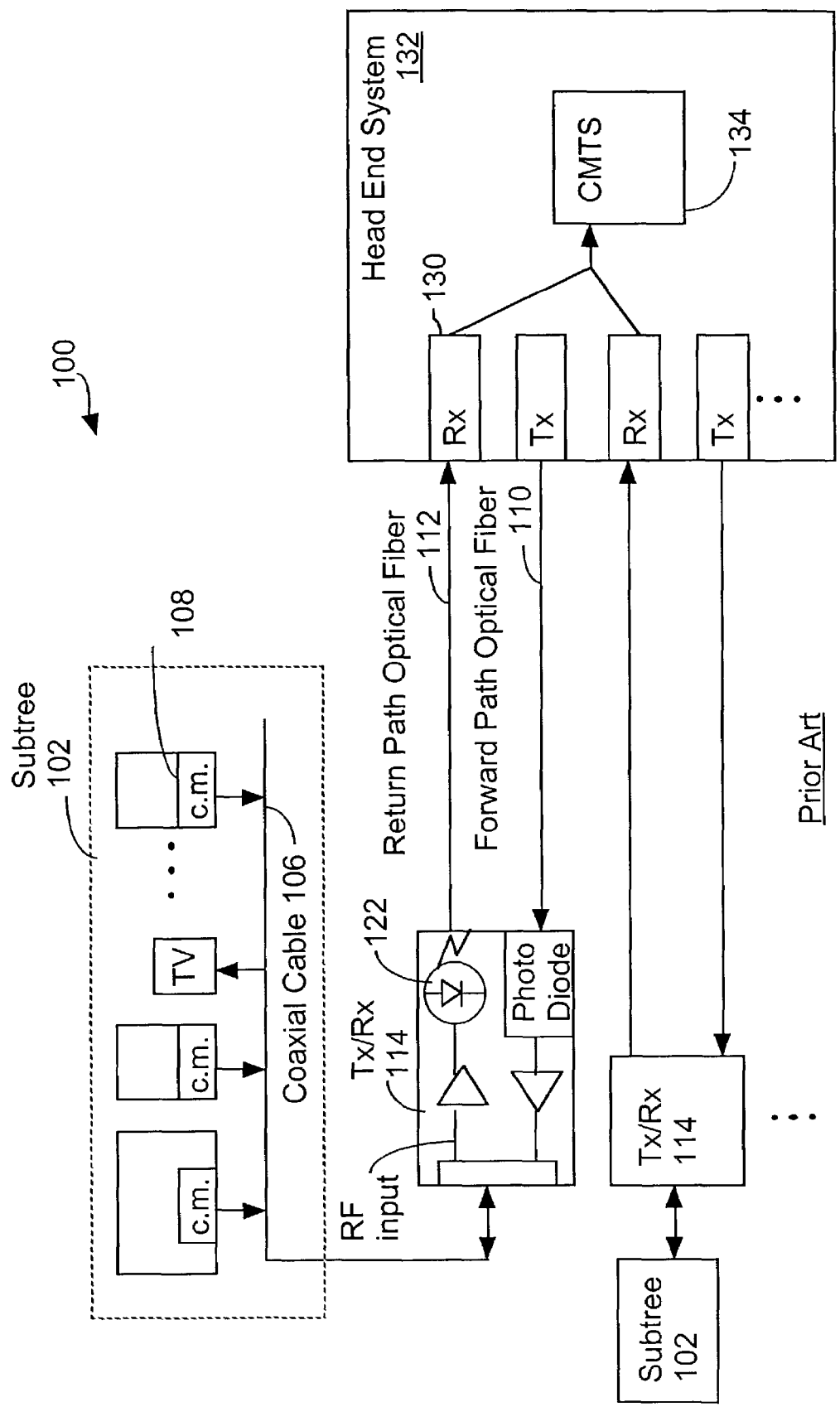
FIG. 1 is a block diagram of a prior art analog return path link system.
Figure 4:
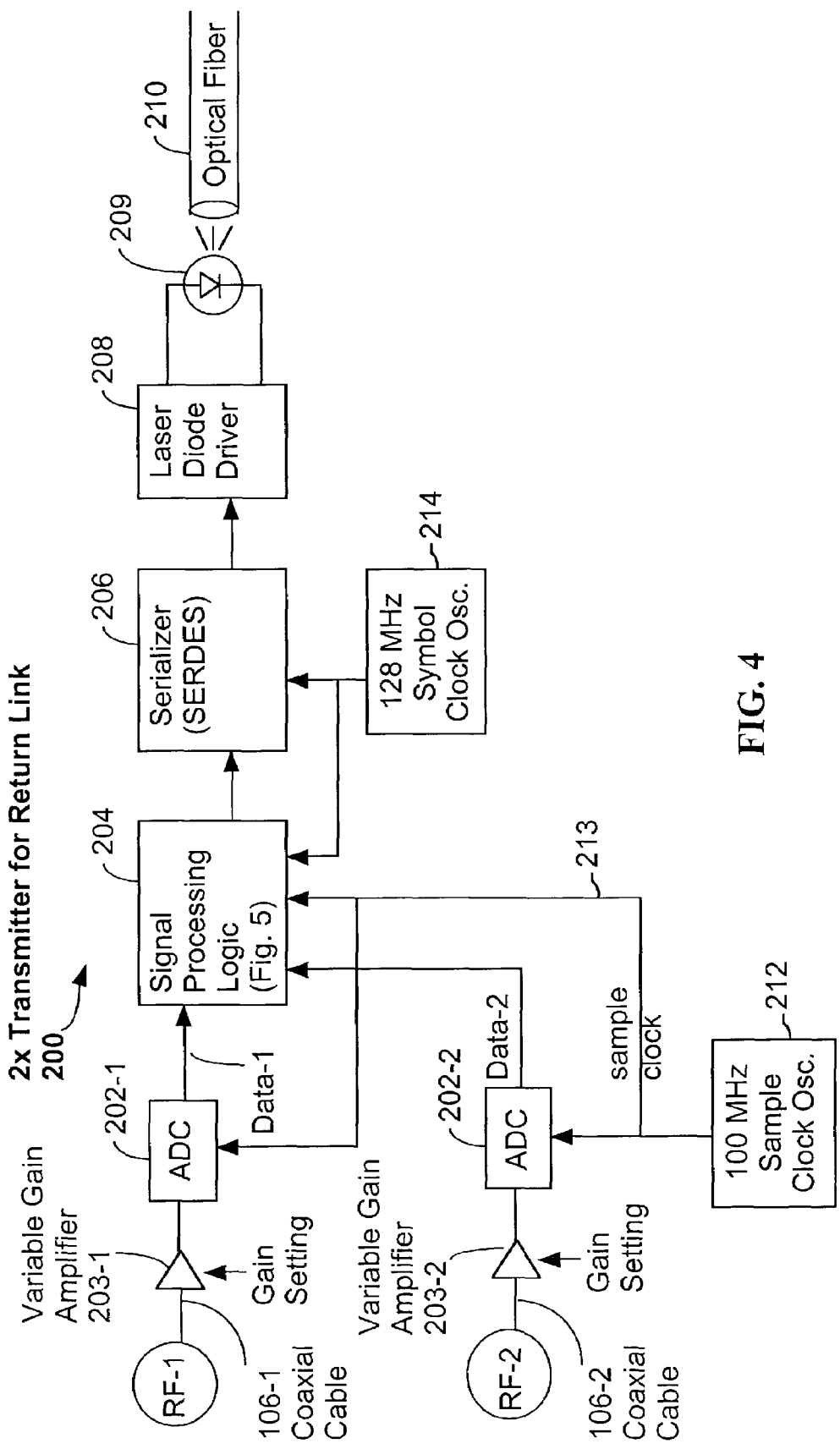
FIG. 4 is a block diagram of a dual RF channel transmitter of a digital return path link system in a preferred embodiment of the system.

Referring to FIG. 4, there is shown a preferred embodiment of a dual RF channel transmitter 200 of a digital return path link of the present invention. In particular, the transmitter 200 is preferably configured to receive two radio frequency (RF) signals from two separate coaxial cables 106-1, 106-2. Each RF signal is processed by a variable gain amplifier 203-1, 203-2 and digitized by a pair of analog to digital converters (ADC) 202-1, 202-2. As will be discussed in more detail below, in some embodiments of the present invention the gain of each variable gain amplifier 203 is controlled via commands received from the head end of the system. These commands are received by a control logic circuit 227 (shown in FIG. 5) which uses the commands to set the gain of the amplifiers 203, as well as to set the mode of other components of the transmitter 200.

It should be understood by the reader that all clock rates, data structures and the like presented in this document are the values used in certain particular embodiments of the invention. Clock rates, data structures and the like may vary widely from one embodiment of the present invention to another, depending on the performance requirements of the embodiment as well as other factors.

The return path transmitter 200 further includes a sample clock oscillator 212 generating a 100 MHz sample clock signal 213. The oscillator 212 is preferably located directly next to one or both of the ADCs 202-1, 202-2. The sample clock oscillator 212 is used to digitize the incoming RF signals with very low jitter. Care is taken to ensure that the sample clock signal is not manipulated by any additional logic, because any such logic may increase jitter in the sample clock signal 213.

A single RF channel version of the transmitter 200 will be discussed below. Furthermore, the preferred embodiments of the present invention can be modified to receive and process more than two RF signals. One such embodiment, herein called the summer embodiment or daisy-chain embodiment is discussed below.

In the preferred embodiment, each ADC 202-1, 202-2 is a twelve-bit A/D converter from Analog Devices with a one volt differential input range, clocked by the 100 MHz sample clock. Preferably, only ten bits of the twelve-bit output from the ADCs 202-1, 202-2 are used. Of course the particular ADC used and the number of data bits used will vary from one implementation of the invention to the next. The outputs from ADCs 202-1, 202-2 are then passed through a signal-processing logic circuit 204 before being presented to a serializer-deserializer (SERDES) 206 (e.g., TLK-2500 from Texas Instruments).

The signal-processing logic circuit 204 processes the received RF signals and outputs a sequence of data frames. In a preferred embodiment, each data frame contains 80 bits of RF data; however the number of data bits per frame is a matter of design choice and thus may be different in alternate embodiments. The signal-processing logic circuit 204 also generates ancillary data words to be inserted between data frames and generates a frame control signal to indicate whether the output it is currently generating is part of a data frame or a part of the ancillary data stream. Subsequently, the output of the signal-processing logic circuit 204 is serialized by the SERDES 206, which also performs an 8b/10b data conversion so as to produce a bit balanced data stream. The output of SERDES 206 is then transmitted by a digital transmitter 208, 209 down an optical fiber 210 as a digitally modulated optical signal.

A 128 MHz symbol clock signal, generated by a symbol clock 214, is multiplied by the SERDES circuit 206 to produce a 2.56 Gb/s clock signal that is used to serially clock the bits from the SERDES circuit 206 to a laser diode driver 208.

Figure 5:
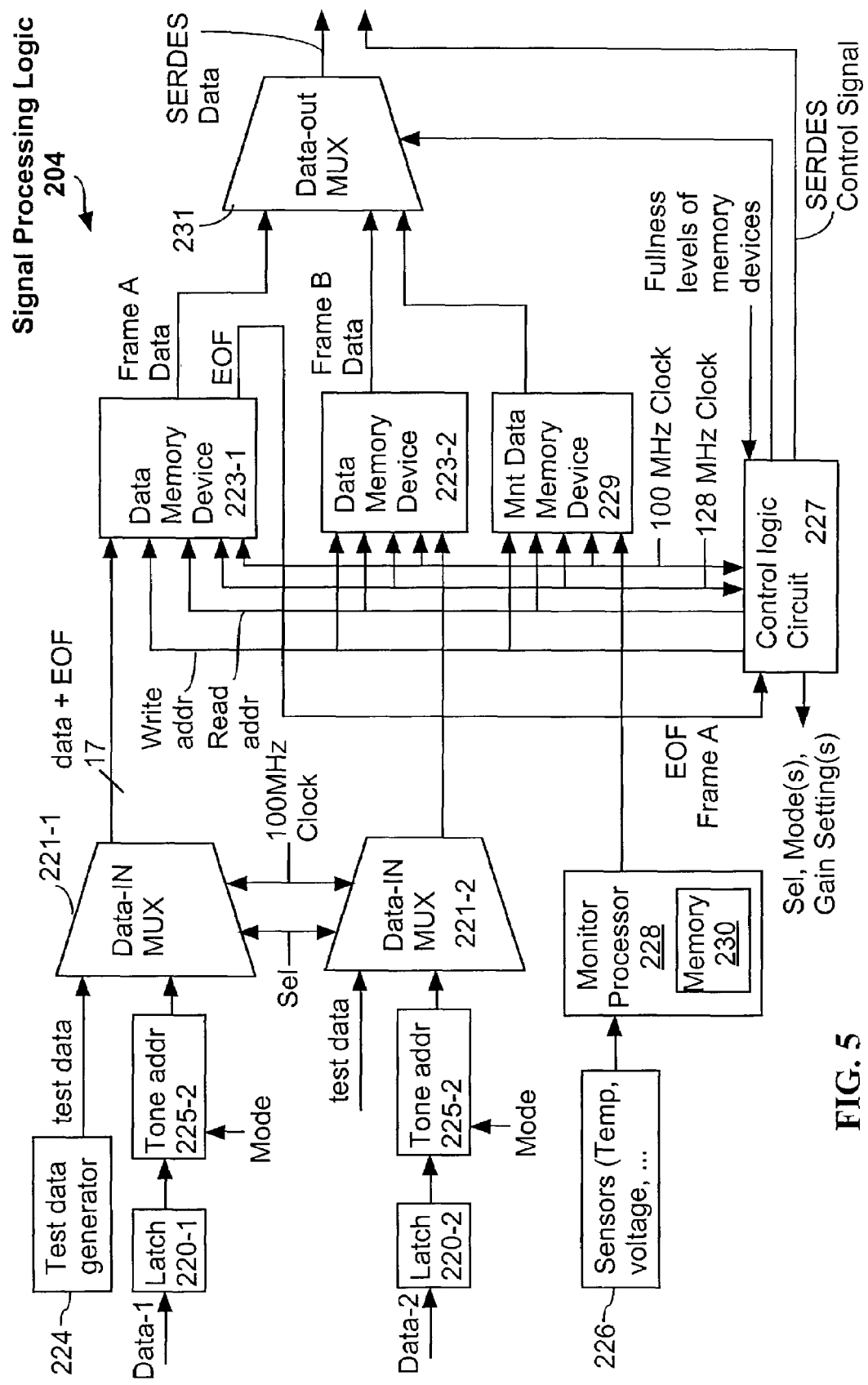
FIG. 5 is a block diagram of transmitter signal processing logic in the dual RF channel transmitter of a digital return path link system in a preferred embodiment of the system.

Referring to FIG. 5, there is shown a preferred embodiment of the signal processing logic circuit 204, which is used in the transmitter 200 shown in FIG. 4. A pair of latches 220-1, 220-2 is provided to receive two digitized radio frequency (RF) analog signals from the ADCs 202-1, 202-2 (shown in FIG. 4). These two data signals are hereinafter referred to as the first and second data streams. The first data stream from ADC 202-1 is received by a first latch 220-1, and the second data stream from ADC 202-2 is received by a second latch 220-2. The first data stream, after it has been buffered and converted into frames of a predetermined size (e.g., 80 bits) is called the Frame A data, and the second data stream, after buffering and framing is called the Frame B data.

In a preferred embodiment the digitized data streams flowing through the latches is dithered by adding on top of the data streams a set of "tone signals" using a tone generator and adder circuit 225-1, 225-2. In one embodiment, the tone generator and adder circuit 225 generates five tone signals, at frequencies of 100 KHz, 200 KHz, 300 KHz, 400 KHz and 500 KHz and adds low amplitude versions of these tone signals to the RF data streams. The reason for adding the tone signals to the RF data streams is to prevent the digital-to-analog convert in the receiver from creating spurious noise in response to RF data streams that contain no data or almost no data. By adding the tone signals to the RF data, where the tone signals are at frequencies well below the frequency band containing data, the generation of this spurious noise is significantly reduced, typically by about 6 dB. In the preferred embodiments, the frequency band containing data is typically 5 MHz to 45 MHz or 5 MHz to 65 MHz.

A pair of data-in multiplexors 221-1, 221-2 are provided to further process the latched data. Each of the data-in multiplexors 221-1, 221-2 is configured to convert the 10 bit data streams from the ADCs into 16 bit data streams. Preferably, each multiplexor 221 converts eight of the 10-bit input data words into five 16-bit output data words that together form a data frame.

Each of the data-in multiplexors 221-1, 221-2 also receives a set of test data (preferably a digitized sinusoidal signal) generated by a test signal generator 224. The test data is used in testing the transmitter. The data-in multiplexors 221-1, 221-2 selectively output either the digitized RF data streams or the test data in accordance with a selection (mode) signal generated by the control logic circuit 227. The data-in multiplexors 221-1, 221-2 are also configured to generate an end of frame (EOF) flag signal to indicate end of each 80-bit data frame. More specifically, the data-in multiplexors 221-1, 221-2 output a 1-bit EOF flag for every 16-bit word output by the data-in multiplexors 221-1, 221-2. The EOF flag is equal to a first value, such as 0 for the all the 16-bit words of each data frame except the last, and for that last 16-bit word the EOF flag is equal to a second value, such as 1.

The 16 bit data words from the data-in multiplexors 221-1, 221-2 are then forwarded to a pair of data memory devices 223-1, 223-2. In particular, the data words generated from the first data stream are forwarded to a data first memory device 223-1 from the first data-in multiplexor 221-1, and the data words generated from the second data stream are forwarded to a second data memory device 223-2 from the second data-in multiplexor 221-2. In addition to the 16 bit data words, the first memory device 223-1 also stores the EOF flag for each word. Alternately, the EOF flags for the data words of the first data stream can be stored in a separate FIFO memory device.

Both memory devices 223-1, 223-2 store the received data words using the 100 MHz sample clock. However, data is written into the memory devices 223 on only five of every eight clock cycles of the 100 MHz sample clock because the data has been reformatted by the data-in multiplexors 221 from 10 bit words into 16 bit words. Reads from the memory devices 223 are performed using the 128 MHz symbol clock. The data memory devices 223-1, 223-2 are first-in-first-out (FIFO) memory devices, preferably implemented using one or more dual ported RAM's. The writing and reading of data from the memory devices 223 is controlled by a control logic circuit 227, which is implemented using state machine logic.

It is noted that reading 16-bit words from the memory devices 223 and 229 at 128 MHz results in a data being sent to the SERDES 206 at a rate of 2.048 Gb/s. After the SERDES converts each 16 bit word into a 20 bit word, the resulting data rate is 2.56 Gb/s.

The signal-processing logic 204 further includes a set of sensors 226 for monitoring temperature, supply voltage or other voltages, and other parameters of the transmitter 200. The sensor generated values are read by a processor 228, which also includes an internal memory device 230 for storing transmitter identifying information such as serial numbers, model numbers, software and hardware revisions, date of manufacture and the like of the transmitter 200. The processor periodically forwards the sensor generated values and the transmitter identifying information, herein collectively called maintenance data, to a FIFO memory device 229. In a preferred embodiment the maintenance data is forwarded to the memory device 229 once every 40 ms.

The control logic circuit 227 of the signal processing logic 204 is configured to generate read and write addresses for the various memory devices. With respect to the data memory devices 223-1, 223-2, the control logic circuit generates write address during five of every eight cycles of the 100 MHz sample clock and generates read addresses at 128 MHz. The control logic circuit 227 alternates between reading data from first and second memory devices 223, alternating between reading one data frame (i.e., five 16-bit words) from one and one data frame from the other. In addition, when certain criteria are met, the control logic circuit 227 reads maintenance data from the third memory device 229 (i.e., sends the maintenance data to multiplexor 231).

Data is read from the memory devices 223 at a rate that is faster than the combined rate at which data is stored in the two memory devices 223 so that ancillary data from the third memory device can be inserted between data frames without "falling behind" the first and second data streams that are being stored in the two memory devices 223. When there is no maintenance data in memory device 229, or more particularly when there is not yet a complete set of maintenance data ready for transmission, padding words (preferably idles) are inserted between frames at certain times.

When ancillary data words are to be inserted between data frames, a counter located inside the control logic circuit 227 that generates the read addresses is stopped, thereby causing the data memory devices 223-1, 223-2 to keep on outputting the same data word. The control logic 227 also generates a SERDES control signal that sets the mode of operation of the SERDES 206 (FIG. 4). In particular, the SERDES is instructed by the control logic circuit 227 to either (A) perform a 16b to 20b conversion on a data word, (B) output an idle word, or (C) output a carrier word.

The control logic circuit 227 and multiplexor 231 are configured to monitor a fullness level of the RF data memory device 223-1 and maintenance data memory 229, output data stored in the RF data memory devices 223-1, 223-2 in a first mode when the fullness level of memory device 223-1 is more than a predefined threshold level, and to output data stored in the RF data memory devices 223-1, 223-2 and the maintenance (i.e., non-RF) data stored in the memory device 229 in a second interleaved mode when the fullness level of the RF data memory device 223-1 is less than the predefined threshold level.

FIGS. 6A-6C illustrates three different modes for inserting the ancillary data words between the data frames. In these figures, time flows from left to right. This means that the data frame on the left side is output earlier in time than the data frame on the right side. Hence, each sequence starts from an A data frame. Here, an A data frame is a data frame generated from the first data stream, and a B data frame is a data frame generated from the second data stream.

Referring to FIG. 6A, in a first mode during which no ancillary data streams are inserted between the data frames, a sequence of A and B data frames are generated. In other words, a data frame (of five words) from the first data stream is followed by a data frame from the second data stream which in turn is followed by the next data frame from the first data stream and so on. The control logic circuit 227 operates in this mode when the amount of data stored in the data memory devices 223-1, 223-2 is above a predefined threshold fullness level, which requires the stored data to be read out as quickly as possible.

More specifically, every time the write address generated by the control logic circuit 227 cycles back to its starting value (e.g., zero), the read address generated by the control logic circuit 227 is compared with a predefined value, such as the address value at the middle of the memory devices and a "fullness" signal is generated based on that comparison. When the write address (also called the write pointer) is at its starting value and the read address is at the middle value, the memory devices are half full. When the read address is less than the middle value, the memory devices are less than half full and the fullness signal is set to a first value (e.g., "false") and when the read address is greater than or equal to the middle value, the memory devices are at least half full and the fullness value is set to a second value (e.g., "true). The value of the fullness signal remains unchanged until the write address recycles back to its starting value, at which time the fullness signal is re-evaluated. When the fullness signal generated by the control logic circuit is equal to the second value (true), the transmitter operates in the mode shown in FIG. 6A, sending only RF data frames and no ancillary data. However, since the data transmit rate is greater than the data receive rate, by about 2.5% in the preferred embodiment, the fullness value will often be equal to the first value, indicating that either idles or ancillary data can be inserted into the output data stream.

Referring to FIG. 6B, during a second mode, four idle words are inserted as the ancillary data between a B frame and an A frame. More specifically, a data frame from the second data stream is followed by four idle words which is followed by a data frame from the first data stream. This in turn is followed by a data frame from the second data stream and so on. The control logic circuit 227 operates in this mode when the amount of data stored in the memory devices is below the threshold fullness level (i.e., the fullness signal has a value of "false"), but there is no maintenance data that is ready to be transmitted from memory device 229. The control logic circuit 227 is synchronized with the boundaries of the output data frames by the EOF framing bit that it receives whenever the last word of an A frame is output. Using the EOF framing bit, the current fullness value, and a signal indicating whether there is maintenance data that is ready to be transmitted from the memory device 229, the control logic will insert four idles after the end of the next B frame when the fullness value has a value indicating the memory devices are below the threshold fullness level and there is no maintenance data that is ready to be transmitted from the memory device 229.

Referring to FIG. 6C, during a third mode, between a B frame and an A frame four words are inserted. In particular, the four words, forming the ancillary data includes one idle word, one carrier word and two maintenance data words. The carrier word is used to indicate that the two maintenance data words are transmitted instead of the last two idle words. The control logic circuit 227 operates in this mode when the amount of RF data stored in the memory devices is below the threshold level and there is maintenance data in memory device 229 that is ready to be transmitted. If, for example, the amount of maintenance data to be transmitted is 100 words, approximately 24 words of this data will be transmitted each time the memory devices 223 are determined to be below the threshold level. These 24 words of maintenance data are transmitted, two words at a time, after each of twelve successive B frames, after which the fullness of the memory devices 223 will be reevaluated. At the gigabit per second data rates used in the system, and the generation of a new packet of maintenance data only once every 40 ms (occupying a bandwidth of approximately 100 Kb/s, including the idle and carrier overhead words and 8$b$/10$b$ encoding overhead), the maintenance data occupies only a very small fraction of the 60 Mb/s bandwidth available in the auxiliary data "channel." (Of the 60 Mb/s bandwidth of the auxiliary data channel, 50% is used by idle and carrier marks to denote the presence of data in the channel, and 20% of the remaining bandwidth is occupied by the 8$b$/10$b$ encoding, resulting in a true raw auxiliary data bandwidth of approximately 24 Mb/s. This 24 Mb/s of available bandwidth is still very, very large compared to the 40 Kb/s raw data rate used for maintenance data transmission in the preferred embodiment.)

Referring to FIG. 5, the data frames generated from the first and second data streams along with the maintenance data are sent to a data-out multiplexor 231. The operations of the data-out multiplexor 231 are controlled by the control logic circuit 227. In summary (as will be explained in more detail below), the data-out multiplexor 231 operates in one of the three modes discussed above in connection with FIGS. 6A-6C.

In addition, the control logic circuit 227 sends control signals to the SERDES 206 (FIG. 4) to control the transmission of data from the data memory devices 223-1, 223-2 and idle words.

As discussed above, the output of the data-out multiplexor 231 is prepared for the serializer/deserializer (SERDES) circuit 206, a link serializer chip which has a sixteen-bit wide input. Each sixteen-bit word is converted by the SERDES circuit 206 into a twenty-bit symbol. Only the serializer function of the SERDES circuit 206 is used in transmitter 200, while the deserializer function is used in the receiver 250. The SERDES circuit 206 maps all possible eight-bit symbols into ten-bit symbols that are "balanced" with respect to 1 and 0 bits, and which provide sufficient data transitions for accurate clock and data recovery. Further, the SERDES circuit 206 maps two eight-bit words at a time, and thus converts sixteen-bits of data at a time into twenty-bit symbols. This mapping, called link encoding or 8B/10B encoding, adds twenty-five percent overhead to the transmitted data stream. Therefore if data is submitted to the link at a rate of 2.00 Gb/s, the link must transmit data at a rate of at least 2.5 Gb/s. In the preferred embodiment, the optical link operates at 2.56 Gb/s. The extra bandwidth is used by the link to transport the ancillary data. Serial data from the serializer circuit 206 is driven into a fiber optic transmitter 208, 209 that converts electrical 1 and 0 bits into optical 1 and 0 bits. This fiber optic transmitter includes a laser diode driver 208 and a laser diode 209. This device modulates the light generated by the laser 209 and also keeps it stable over temperature and changing supply voltages.

Return Path Single RF Signal Transmitter

Figure 7:
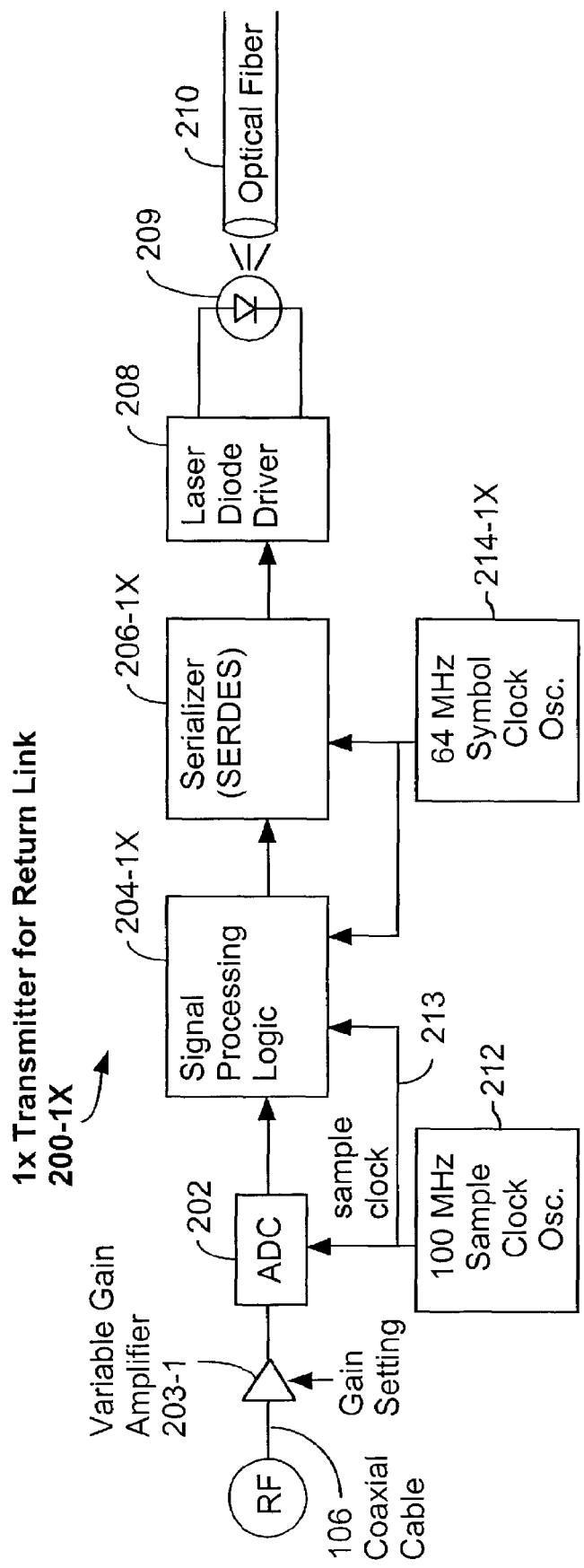
FIG. 7 is a block diagram of a single RF channel transmitter of a digital return path link system in a preferred embodiment of the system.
Figure 8:
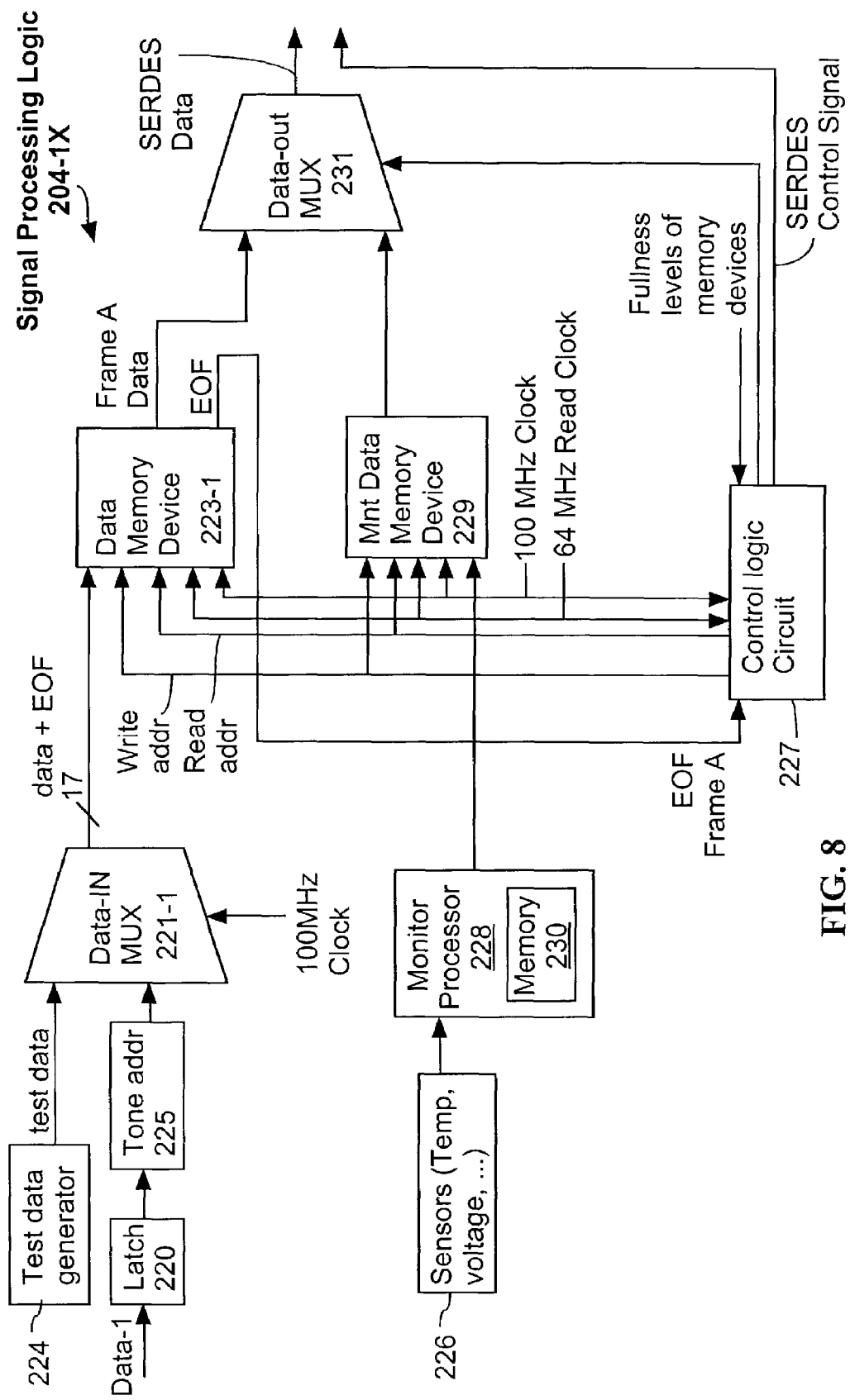
FIG. 8 is a block diagram of transmitter signal processing logic in the single RF channel transmitter of a digital return path link system in a preferred embodiment of the system.

A single RF data channel RF signal transmitter 200-1X is shown in FIGS. 7 and 8. Since the operation of this version of the RF signal transmitter is almost identical to that of the return path dual RF signal transmitter described above with respect to FIGS. 4, 5 and 6, only the aspects of this transmitter 200-1X that differ from the dual channel transmitter 200 will be described here.

First, of course, the single RF data channel transmitter 200-1X uses only one input amplifier 203, ADC 202, data latch 220 and tone adder 225. Since the single channel transmitter 200-1X has only one channel of RF data, with a raw data rate of 1.0 Gb/s, the symbol clock (produced by symbol clock generator 214-1X) can use a rate as low as 64 MHz, which is half the speed of the symbol clock of the dual channel transmitter. In one embodiment, the single channel transmitter 200-1X uses a symbol clock rate of 80 MHz because that is the minimum clock rate useable with a preferred SERDES 206 circuit. In this embodiment, additional bandwidth is available for use in the auxiliary channel. For convenience, the single channel transmitter will be described with a 64 MHz symbol clock, but it is to be understood that clock rates above 64 MHz would work equally well.

Referring to FIG. 8, the control logic circuit 227-1X uses the A frame EOF signal slightly differently than in the dual channel version. In particular, if the data memory device fullness signal has been evaluated to be "false," indicating the memory device 223 is less than the threshold level of fullness, and there is maintenance data ready for transmission in the maintenance data memory 229, then an I C M M sequence of idle, channel and maintenance data words is inserted after the A frame so as to interleave maintenance data with the A frame data. If there isn't maintenance data ready for transmission in the maintenance data memory 229, and the fullness signal is "false," then four idle words are inserted after the A frame. When the fullness signal is "true," A frames are transmitted without interruption by idles or maintenance data.

Return Path Receiver

The receiver 250 at the receive end of the link receives the digitally modulated light, processes it with a sequence of digital signal-processing circuits that prepare the data and then pass it to a pair of digital to analog (D/A) converters 270-1, 270-2. The output of the D/A converters 270-1, 270-2 are "regenerated RF signals" that closely match both the frequency domain and time domain characteristics of the RF signals on coaxial cables 106-1, 106-2, respectively. The dual channel version of the receiver 250 will be described first; the single channel version of the receiver will then be described in terms of the differences between dual and single channel versions.

Figure 9:
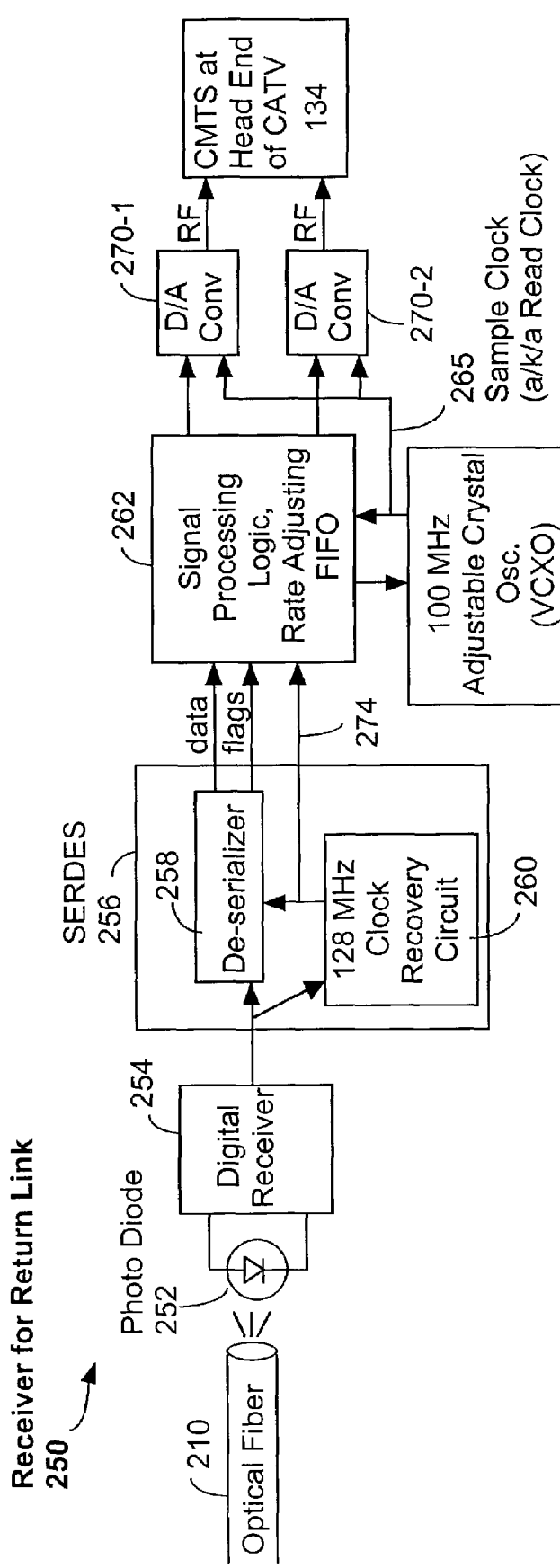
FIG. 9 is a block diagram of the receiver of a digital return path link system in a preferred embodiment of the system.
Figure 10:
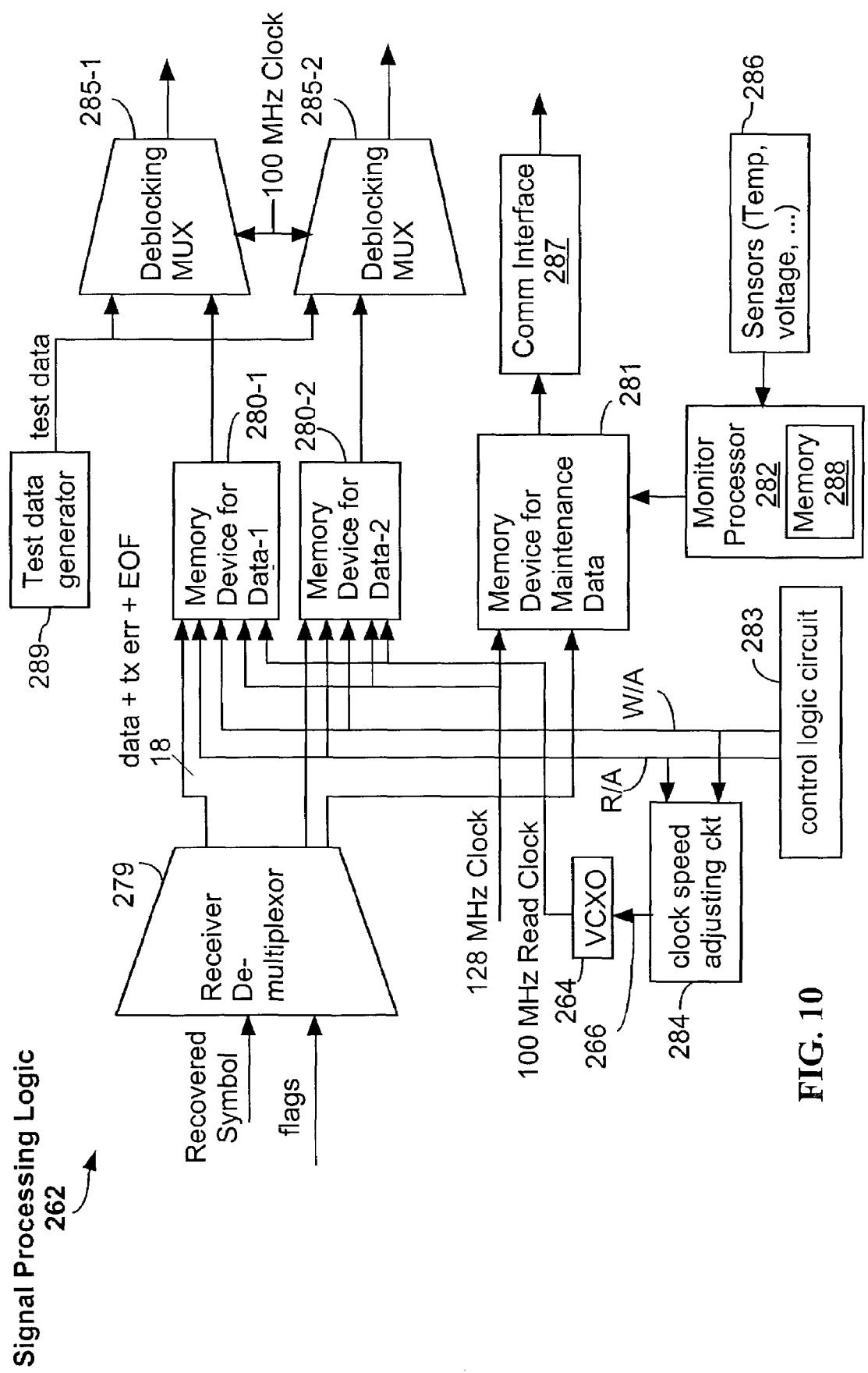
FIG. 10 is a block diagram of receiver signal processing logic in the receiver of a digital return path link system in a preferred embodiment of the system.

Referring to FIGS. 9 and 10, the receiver 250 at the receive end of the optical fiber 210 includes a fiber receiver 252, 254 that changes the optical 1 and 0 bits transmitted over the optical fiber 210 back into the appropriate electrical 1 and 0 bits. This serial bit stream is driven into a deserializer circuit 258 of a serializer/deserializer (SERDES) circuit 256 (e.g., TLK-2500). The SERDES circuit 256 also includes a clock recovery circuit 260 that recovers the 2.56 GHz bit clock and the 128 MHz symbol clock from the incoming data. The deserializer 258 converts the received data from twenty-bit words into sixteen-bit data words using either standard or proprietary 10$b$/8$b$ or 20$b$/16$b$ decoding.

The sixteen-bit data words are in turn clocked, using the recovered symbol clock, into a receiver signal processing logic circuit 262. The deserializer 258 generates a set of flag signals in addition to decoded data values. The flag signals indicate whether the current symbol is a data word, idle word, or carrier word. Maintenance data words are identified by the signal processing logic 262 as the two data words following an idle word and carrier word.

The receiver signal processing logic 262 is implemented in the preferred embodiment using a field programmable gate array (FPGA), a QL4016 from QuickLogic, which includes a pair of receiver data memory devices 280-1, 280-2 in the dual channel version of the receiver, and one such data memory device in the single channel version. The memory devices 280-1, 280-2 are preferably FIFO memory buffers implemented by one or more asynchronous dual ported RAM's (random access memory's).

Figure 11:
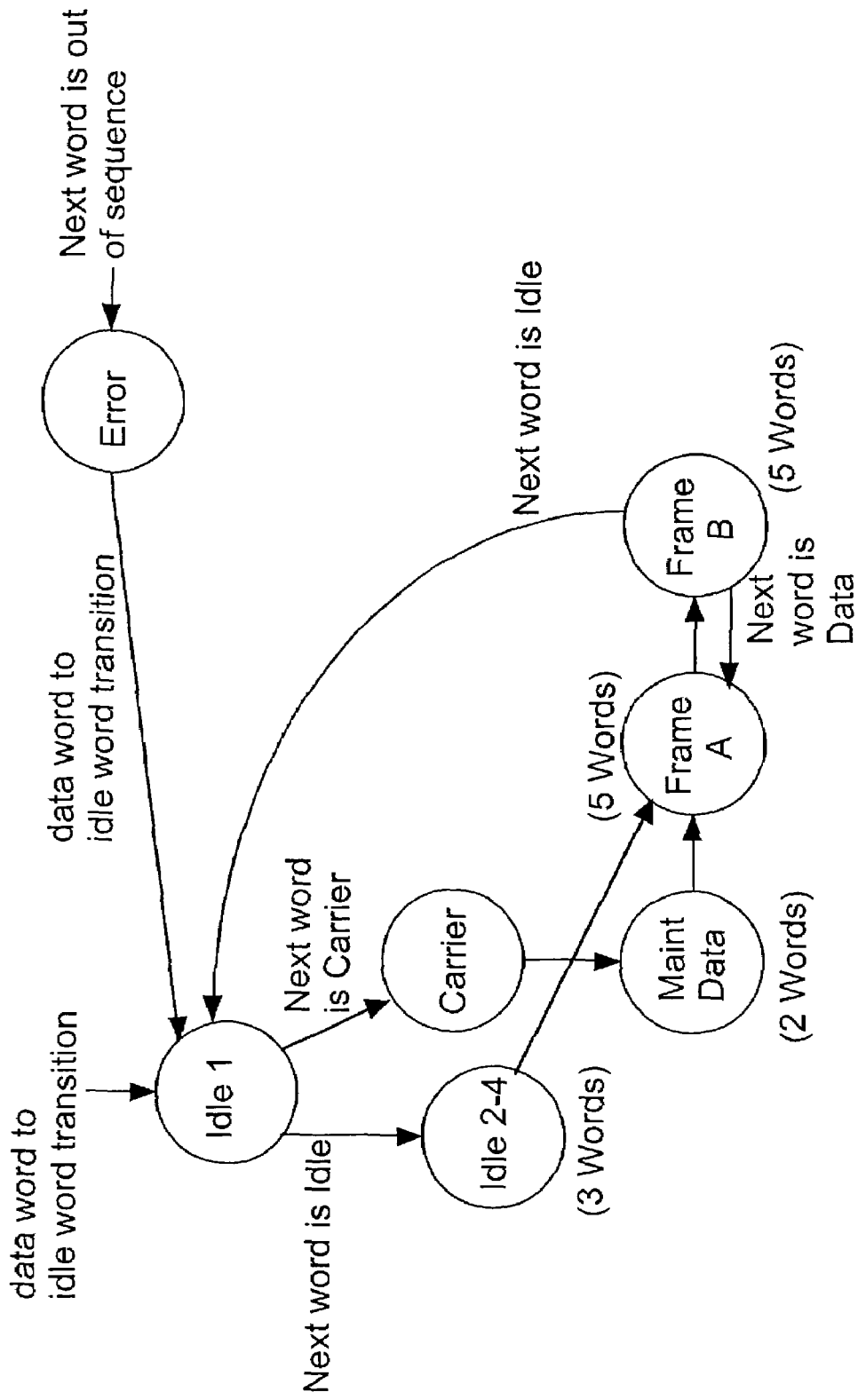
FIG. 11 is a state diagram for a demultiplexor in the receiver of FIGS. 9 and 10.

Referring to FIGS. 10 and 11, the receiver's signal processing unit 262 includes a demultiplexor 279 which receives the deserialized data and the flag signals from the deserializer 258. The demultiplexor 279 is configured to send data words from the A frames to memory device 280-1, and data words from B frames to memory device 280-2 and maintenance data to a memory device for maintenance data 281. Each transition from a data word to an idle word is used to reset a state machine in the demultiplexor to a starting (Idle 1) state, which in turn allows the multiplexor 279 to accurately generate an end of frame bit for each RF data word. Idles and carrier words are not written into any of the memory devices. The demultiplexor 279 is also configured to generate appropriate write enables signals, transmission error bit and end of frame signals. A transmission error bit and end of frame bit are generated for each data word and are forwarded to memory devices 280 for storage along with the data words. In an alternate embodiment, the transmission error bit and end of frame bit for each data word can be stored in a parallel memory device.

FIG. 11 shows a simplified state diagram for the receiver demultiplexor 279. This diagram shows the main states, but does not show all error 'states and furthermore clumps together certain groups of states such as the individual data word states. Thus, the Maint Data state handles the storage of two data words into the maintenance data memory device 281. More importantly, the Frame A state handles a sequence of five data words, storing four in memory device 280-1 with EOF set equal to 0 and storing the last data word in memory device 280-1 with EOF set equal to 1. The Frame B state similarly handles a sequence of five data words, storing four in memory device 280-2 with EOF set equal to 0 and storing the last data word in memory device 280-2 with EOF set equal to 1. Each transition from a data word to an idle word resets the state machine back to the Idle 1 state, regardless of the current state of the state machine (i.e., this happens not only when in the Frame B state). As a result, if the receiver becomes desynchronized with the transmitter, for instance if there is a transmission error that causes the receiver to loose track of where it is in the transmitted data sequence, the data word to idle word transition is used to reset the demultiplexor back to a well defined state.

Referring again to FIG. 10, a receiver control logic circuit 283 generates read and write addresses for the various memory devices located in the receiver signal processing unit 262. With respect to the data memory devices 280-1, 280-2, the control logic circuit 283 generates write address at 128 MHz (for writing 16 bit data words into memory devices 2801, 280-2 and 281) and the read addresses at 100 MHz (for reading 16-bit data words out of each of the memory devices 280-1 and 280-2 in parallel). However, data is read from the memory devices 280-1 and 280-2 on only five of every eight clock cycles of the 100 MHz sample clock so that one 80-bit data frame is transferred from each memory device 280 once every eight cycles of the 100 MHz sample clock.

A clock speed adjusting circuit 284 determines whether an excessive amount of data is stored in the data memory devices 280-1, 280-2 by monitoring the read and write addresses. In particular, each time the write address generated by the control logic 283 wraps around to a starting value, the fullness of the memory devices 280 is determined by comparing the current read address with a predefined threshold. When the read address indicates that the fullness of the memory devices 280 is above a threshold fullness level (e.g., a half), the clock speed adjusting circuit 284 adjusts a clock adjusting signal 266 so as to reduce the memory read clock rate (which has a nominal rate of 100 MHz), and when the memory devices 280 are at or above the threshold fullness level the clock speed adjusting circuit 284 adjusts the clock adjusting signal 266 so as to increase the memory read clock rate. The clock speed adjusting circuit 284 preferably makes this determination each time the write address wraps around to a starting value, and then adjusts the clock adjusting signal 266 accordingly.

A 100 MHz VCXO (voltage controlled crystal oscillator) 264 is used to generate a sample clock signal 265, also called the read clock, that is locked to the 100 MHz sample clock 213 of the transmitter 200. The VCXO 264 is tuned to have a center frequency of 100 MHz, and to respond to the clock adjusting signal 266 by preferably varying its frequency by plus or minus 100 parts per million (i.e., from a low of 99.99 MHz to a high of 100.01 MHZ).

If the rate of the sample clock 265 in the receiver 250 is faster than the rate of the sample clock 213 in the transmitter 200, then the receiver memory devices 280-1, 280-2 will become less than half full, at first intermittently and then consistently. When the clock speed adjusting circuit 284 determines that the memory devices 280-1, 280-2 are less than half full (or more generally, less than a threshold level of fullness), the clock adjusting signal 266 is adjusted and applied to a speed adjust pin of the VCXO 264 to slow its 100 MHz clock rate down by a small amount. The rate of the sample clock 265 generated by the VCXO 264 is adjusted until it is roughly in balance with the sample clock 213 of the transmitter 200.

While actual balance between the sample clocks 265, 212 of the receiver 250 and transmitter 200 may never occur, the clock tracking circuitry of the clock speed adjusting circuit 284 permits the return path link system to dynamically achieve full frequency tracking and locking between the sending and receiving ends of the link.

The use of the VCXO 264, which runs off a local crystal, to generate the receiver's sample clock 265 enables the generation of a very low jitter sample clock while still allowing the use of a correcting voltage to speed up or slow down the sample clock.

The receiver signal processing logic 262 further includes sensors 286 that monitor temperature, voltages and other parameters of the receiver 250. A processor 282 includes an internal memory device 288 that stores serial numbers, model numbers, software and hardware revisions, date of manufacture and the like of the receiver 250. The processor 282 periodically stores receiver maintenance data, including sensor data received from the sensors 286 and the receiver identification data stored in the processor's internal memory 288, in memory device 281. Thus memory device 281 stores both transmitter maintenance data packets and receiver maintenance data packets. The control logic circuit 283 is configured to read out the maintenance data from both the transmitter and receiver stored in the memory device 281 and send them serially out through a communication interface 287, such as an RS-232 interface, to either a main controller of the receiver 250 or to a host computer. The device receiving the maintenance data can store it and/or analyze the maintenance data so as to determine whether the transmitter and receiver are operating properly.

The receiver signal processing logic 262 also includes a pair of deblocking multiplexors 285-1, 285-2. The deblocking multiplexors are configured to receive the data read out from the memory devices 280-1, 280-2 along with associated control signals. The deblocking multiplexors 285-1, 285-2 are configured to convert each 80 bit data frame from a set of five 16-bit words into eight 10-bit words; this data format conversion is herein called the deblocking function. In addition, the deblocking multiplexors 285-1, 285-2 use the end of frame flag signal to reset the deblocking function in case it ever gets out of sync. This gives the receiver 250 a very substantial error recovery process. Any deblocking error will automatically be fixed when the next end of frame is received. If for any reason the deblocking circuitry gets "out of synch" with the data stream, the circuitry automatically recovers within one frame length of 80 bits (five 16-bit words); for instance, upon receiving an EOF signal that is not in the fifth 16-bit word of the current data frame, a deblocking multiplexor 285 may discard the data in the current frame and then restart its processing by treating the next data word from memory device 280 as the first 16-bit word of a next data frame.

Moreover, if a data word read out of the memory devices 280-1, 280-2 has the transmission error bit set in, the deblocking multiplexors 285-1, 285-2 substitute the last previous good value that was read out of the memory devices 280-1, 280-2 in place of the bad received value. For most cases, this will be the same or close to the actual data transmitted in error. This gives the receiver 250 the opportunity to digitally filter out a single transmission error from the data stream.

The deblocking multiplexors 285-1, 285-2 may also operate in a test mode, sending test data generated by a test generator circuit 289 in place of the RF sample data from memory devices 280-1, 280-2.

The single channel version of the return path receiver is essentially the same as that shown in FIGS. 9 and 10, except as follows. Only one memory device 280 and one deblocking multiplexor 285 is needed. Thus, received RF data is sent by the demultiplexor 279 only to the one memory device 280 and maintenance data is sent to memory device 281. In addition, the sample clock of the single channel receiver operates at 64 MHz instead of 128 MHz.

Discussion of CATV Digital Return Path Clock Generation and Management

As discussed above, digital CATV return path systems require the A/D and D/A sampling clocks to be at the same frequency, with very low jitter. Furthermore, in prior art systems, the frequency of the A/D clock must be transported over the communications link with the sampled data to reconstruct the signal. Jitter on either sampling clock results in noise in the recovered analog signal.

In the present invention, at the transmitter 200 shown in FIG. 4, a low noise oscillator 212 is used to generate the sample clock that is used to clock data from the A/D converter 202 into the FIFO buffers 223-1, 223-2. A separate oscillator 214 is used to generate the symbol clock for the transmitter. In order for the frequency of the symbol clock generator 214 to be independent of the sample clock frequency, the transmission rate over the communications link must be higher than the data rate generated by the A/D converters 2021, 202-2. The transmitter's signal processing logic 204 sends data from the FIFO buffers 223-1, 223-2 over the optical fiber 210 when there is sufficient data in the FIFO buffers 2231, 223-2, and otherwise the data sent over the optical fiber 210 is padded with other characters.

The receiver 250 receives data from the communications link 210 and recovers the symbol clock signal 274. The receiver 250 recognizes which received symbols are data and which are pad characters. The data symbols that are RF data samples are placed in the receive FIFO buffers 280-1, 280-2 (FIG. 10) using the symbol clock signal 274. RF data samples are sent from the FIFO buffers 280-1, 280-2 to the D/A converters 270-1, 270-2 at the sample clock rate. The regenerated RF signals produced by the D/A converters 270-1, 270-2 are processed by a CMTS (cable modem termination system) 134, which processes the RF signals so as to determine the subscriber originated messages encoded in those RF signals. Depending on the configuration of the CMTS 134, the two regenerated RF signals may be summed on an input port of the CMTS 134, or the two regenerated RF signals may be directed to different input ports of the CMTS 134.

Figure 9A:
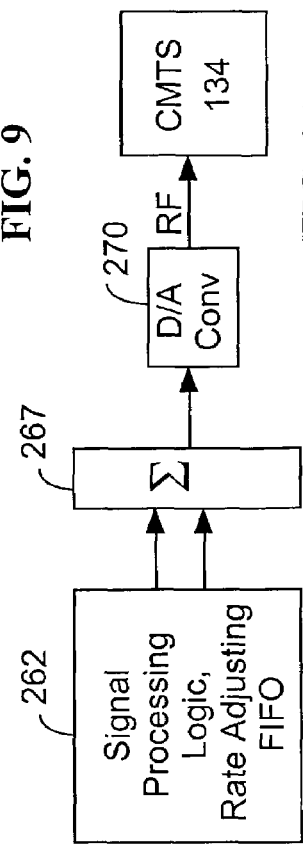
FIG. 9A is a block diagram of an alternate embodiment of a portion of the receiver shown in FIG. 9.

In an alternate embodiment shown in FIG. 9A, the digital RF data samples in FIFO buffers 280-1 and 280-2 are mathematically summed by a summer 267 and the resulting sum is sent to a single D/A converter 270 at the sample clock rate. The D/A converter 270 generates an analog, regenerated RF signal that is equal to the sum of the two RF signals that were sampled at the two subtrees. From another viewpoint, the analog signal comprises regenerated versions of the first and second RF signals superimposed on each other. The regenerated RF signal is sent to the CMTS 134 for processing.

The sample clock 265 is generated by the VCXO 264. The VCXO's 264 frequency is adjusted slowly over a small range to keep the rate of data taken from the FIFO buffers 280-1, 280-2 the same as the rate data is placed into the FIFO buffers 280-1, 280-2. Control of the VCXO's 264 frequency is accomplished based on the amount of data in the FIFO buffers 280-1, 280-2. If the FIFO buffers 280-1, 280-2 are more than half full (or any other appropriate threshold level), the VCXO's 264 frequency is increased, taking data out faster. If the FIFO buffers 280-1, 280-2 are less than half full, the VCXO's 264 frequency is decreased, taking data out slower.

Accordingly, the present invention has lower receiver sample clock time jitter than the prior art systems depicted in FIGS. 2 and 3 because the receiver's sample clock is not contaminated by noise associated with recovery of the symbol clock.

More specifically, in the prior art systems, the recovered clocks derived from a multiplied clock at the transmitter end 150 (FIG. 2) of the link typically will have jitter of more than 10-20% of the bit cell time. When the link rate is 1.25 Gb/s, (with a bit cell time of 800 ps) it is not uncommon for the received sample clock to have jitter of 100 ps or more. When a sample clock with that level of jitter is used to clock the D/A converter of a receiver, the fidelity of the recovered RF signal will not be able to exceed that of an ideal 8-bit A/D and D/A conversion system.

However, the return links of CATV systems generally require close to a full 10 bits of data in order to match the performance of traditional analog based laser return path links. The frequency locking method of the present invention, including the use of VCXO in the receiver 250, allows the receiver's sample clock to be generated with jitter levels of 20-30 ps for signals between 5 and 50 MHz.

The use of a digital return path in accordance with the present invention has many benefits. For instance, the length of the return path link can be very long without hurting performance, because digital link performance generally does not vary with link distance. Digital fiber optic links can be designed so that there is sufficient SNR for the link to operate "error free" for all practical purposes. Link error rates of less than $10^{-15}$ are not uncommon. Because of this, the return path link system does not show diminished performance from distances as short as 1 meter to those as long as 30 km of fiber or more.

Link performance generally does not vary with poor splices, connectors, device temperature or normal voltage excursions. Again, the characteristics of the link with these changes can be measured, but even with these changes, while they do affect analog measurements, the SNR can be generally kept in the range where error free digital performance is still possible. Therefore, the return path RF link of the present invention operates with a constant SNR over the component variations.

Further, since digital return paths exhibit similar performance to analog return paths under "perfect conditions", digital return paths are able to provide greater immunity to ingress because margin, normally allocated to link degradations such as length, splices and temperature variations, can now be allocated to handling ingress, enabling the system to operate in spite of ingress that would normally drive a return path link system into clipping.

Combining Return Path Data from Multiple Subtrees

Figure 12:
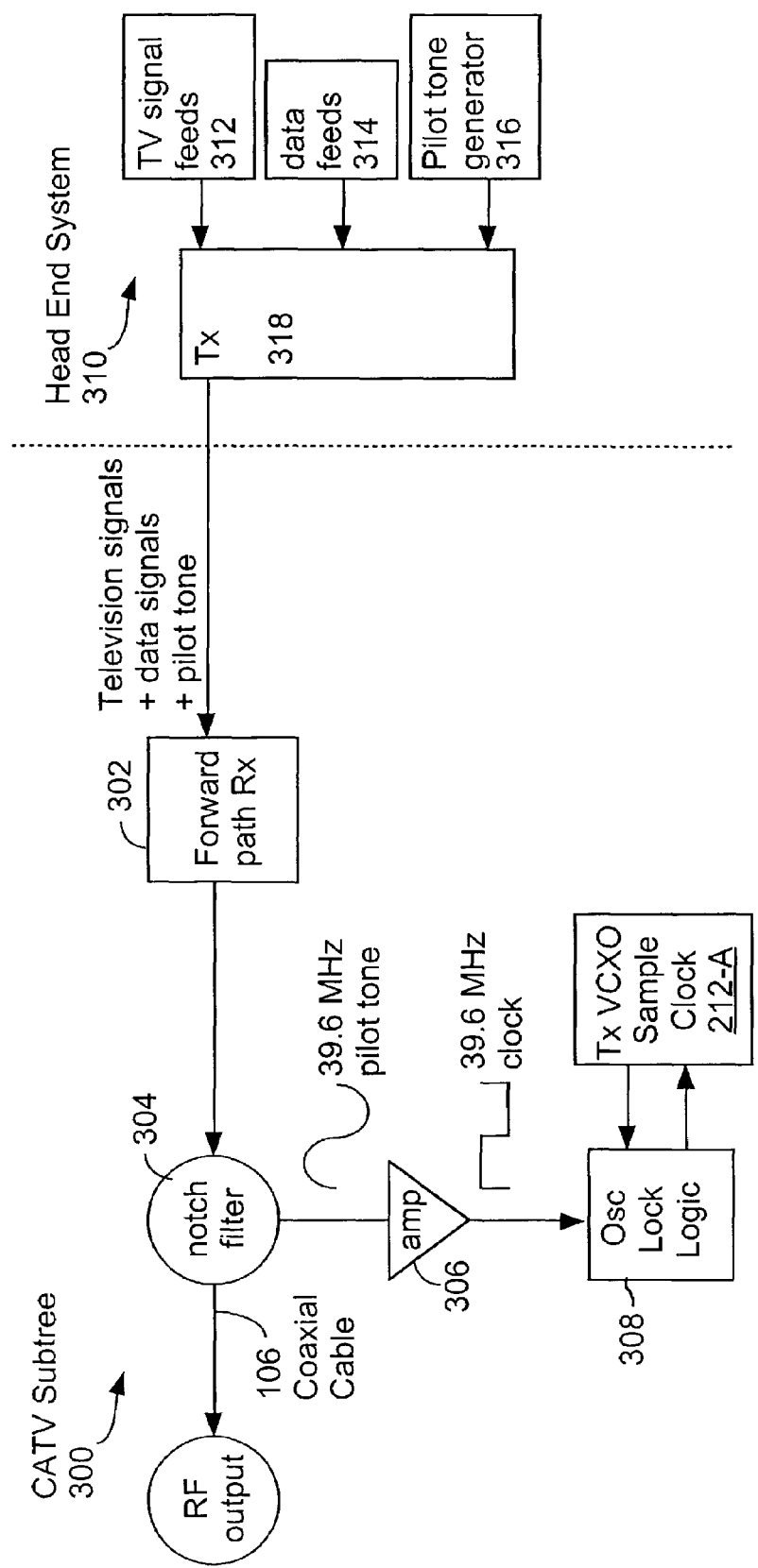
FIG. 12 is a block diagram of a system for synchronizing the return path transmitter sample clocks of multiple subtrees of a cable television network.
Figure 13:
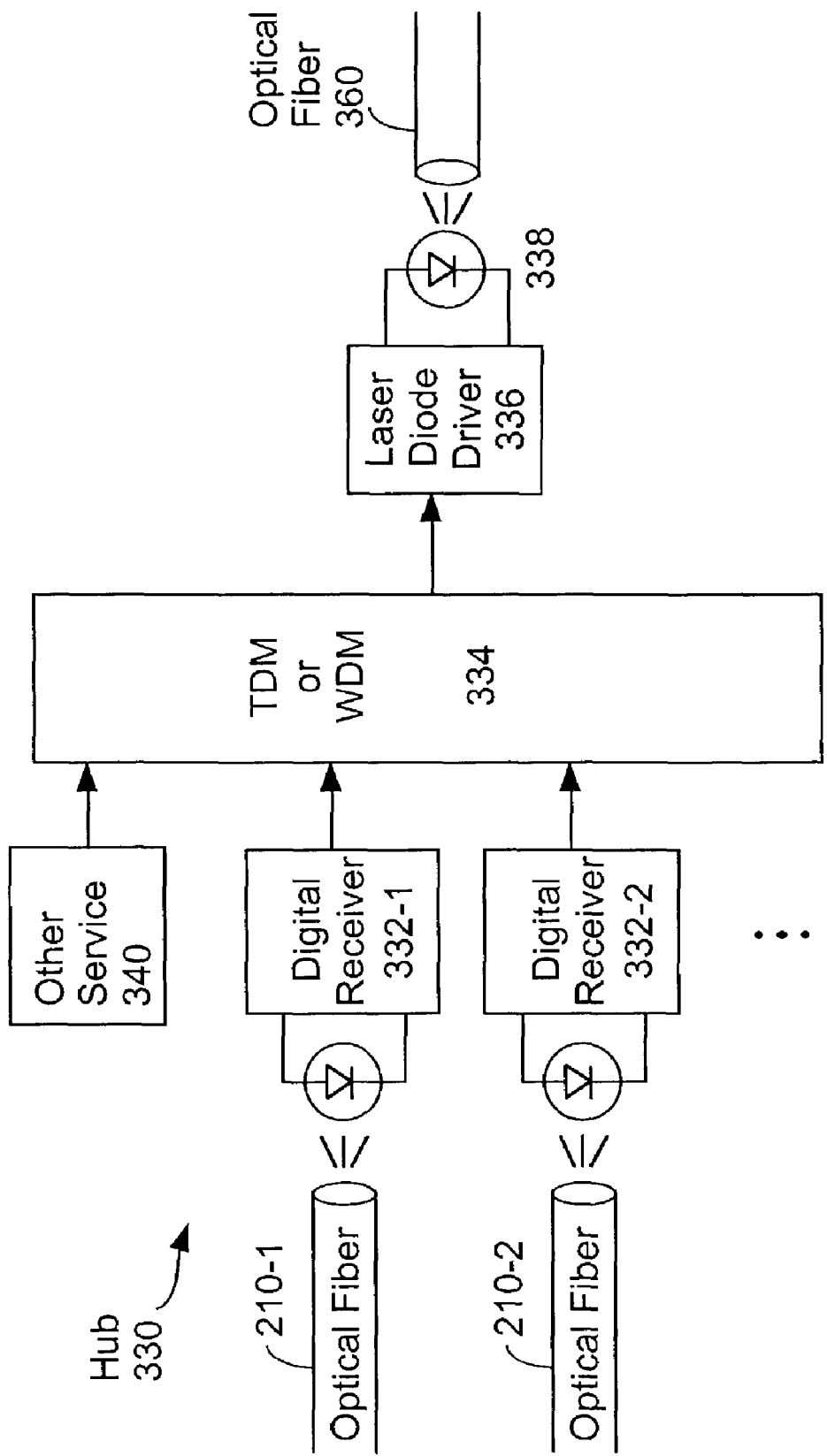
FIG. 13 is a block diagram of a return path hub.

FIGS. 12 and 13 depict an embodiment of the present invention in which the return path data streams from two or more subtrees 300 are received over optical fibers 210, combined at a hub 330 using time division multiplexing (TDM) and then transmitted over the optical fiber 360. The transmitters for each subtree of the system are the same as described above, except that in this embodiment the sample clock for the transmitter (for clocking the ADC's 202) is generated by a separate low noise, precision VCXO (voltage controlled crystal oscillator) 212-A. Furthermore, in order to enable the data streams from the various subtrees to be easily combined, the clock rates of the VCXO's 212-A in all the subtrees are controlled by a pilot tone by oscillator lock logic 308 that is included in the transmitter of each subtree. It is noted that while the rates of all the VCXO's 212-A are forced to the same value, the phases of these clocks are not (and do not need to be) coordinated.

In an exemplary embodiment, the pilot tone is a clock that runs at approximately 40% of a predefined target sample clock rate. For instance, the pilot tone may be a 40 MHz clock signal when the target sample clock rate is 100 MHz. The oscillator lock logic 308 for each subtree 300 receives the locally generated sample clock and generates a correction voltage that ensures that the sample clock rate is precisely equal to 2.5 times the pilot clock rate. Locking of the VCXO 212-A to the pilot tone is accomplished by counting pulses from each and generating a suitable correction voltage (using pulse width modulation and low pass filtering) that is applied to the VCXO. In other embodiments, other sampling clock rates, pilot tone clock rates and sample to pilot clock rate ratios can be used.

FIG. 12 shows apparatus for distributing the pilot tone to the subtrees of a CATV system. At the head end system 310, forward link signals are produced by television signal feeds 312, digital signal feeds 314 (e.g., data from an Internet service provider for viewing by subscribers using browsers) and a pilot tone generator 316. The pilot tone produced by generator 316 is preferably a sinusoidal signal that is added to the television and other signals transmitted over the forward path of the CATV system by a head end transmitter 318. At each subtree 300, a notch filter 304 is used to separate out the pilot tone from the other signals on the forward path, and an amplifier 306 is used to convert the extracted sinusoidal pilot tone into a pilot clock signal. The pilot clock signal is received by the oscillator lock logic 308 of the subtree's transmitter, the operation of which is described above.

As shown in FIG. 13, the return path transmitter apparatus, herein called a hub 330, receives data from two or more subtrees via optical fibers 210. The hub 330 includes a digital receiver 332 for converting the signals from each subtree into electronically stored or buffered data frames which then forward the data frames to a time division multiplexor or wavelength division multiplexor 334. The hub 330 may also receive data from another service or source 314. For instance, the other source 314 may be a system that generates test patterns to enable the head end system to detect data transmission errors.

Signal processing logic in the multiplexor 334 preferably includes a separate FIFO buffer for storing data from each subtree, as well as a FIFO for storing data from the other sources 314. The FIFO buffers for all the subtrees will always, at the beginning of each frame transmission period, have the same level of fullness. Whenever the FIFO buffers for the subtrees are more than half full, a frame of data from each subtree FIFO is transmitted over the return path link. When time division multiplexing is used, the combined data signal is transmitted using a single laser diode driver 336 and laser diode 338. When wavelength division multiplexing is used, multiple laser diode drivers and laser diodes are used.

Whenever the FIFO buffers for the subtrees are less than half full, one or more frames of data from the FIFO for the other service 314 is transmitted over the return path link, and if there is insufficient data in the FIFO for the other service 314, the frames allocated to the other service are filled with pad symbols. The bandwidth available for data from the other service 314 depends on the difference between the output transmission rate of the hub and the combined input data rates of the data streams from the subtrees coupled to the hub.

In this embodiment, all the subtree return path transmitters have essentially the same sampling clock frequency. This enables the system to have coherence between the return path signals as they are collected in intermediate points throughout the system, which in turn enables low cost aggregation of the return path signals.

In TDM implementations where the sample clocks of the subtrees are not controlled by a pilot tone, and thus will vary somewhat from each other, the signal process logic of the multiplexor 334 adds and drops pad characters, as necessary, from the incoming data streams to make up for differences between the clock rates of the received data streams and the clock rate of the hub's symbol transmission clock. As long as the bandwidth occupied by pad characters in each data stream exceeds the worst case mismatch in clock rates between the hub's outgoing symbol clock and the clock rates of the incoming data streams, no data will ever be lost using time division multiplexing. For instance, the signal processing logic of the multiplexor 334 may insert pad symbols in place a data frame for a particular subtree when the RF data FIFO buffers for the other subtrees contain sufficient data for transmission of a next data frame but the FIFO buffer for the particular subtree does not.

As indicated above, a hub may use a wavelength division multiplexor (WDM). In one embodiment, the WDM is a coarse wavelength division multiplexor that transmits two or more data streams on two or more respective optical wavelengths. Using "coarse" wavelength division multiplexing means that the optical wavelengths of the two optical signals are at least 10 nm apart (and preferably at least 20 nm apart) from each other. In a preferred embodiment, each optical fiber 360 carries a first 2.56 Gb/s data stream at 1310 nm, and a second 2.56 Gb/s data stream at 1550 nm.

Aggregation of return path data streams using the node and hub subsystems shown in FIGS. 4, 7 and 13 allows digital return streams to be built up from tributaries and then broken back down at the head end again. Moreover, each individual return can still have its master A/D clock recovered at the head end using the VCXO and FIFO method described above.

Second Method of Traffic Aggregation

In prior art systems, return paths are normally aggregated using analog RF combination techniques, but this causes the link noise to increase without any increase in signal. Digital aggregation using time division multiplexing, as described above, allows simultaneous transport of multiple data streams over a single fiber without signal degradation.

Synchronizing of all of the return path clocks to a single frequency reference allows simpler digital aggregation of multiple streams because the data from each stream is coherent with the others. For example, two return path data streams can be combined by simple addition of the data. This is the same as performing an RF combination, but it does not require that the signals be taken from the digital domain back to analog. This method of combination may be performed at a node where two or more subtrees meet, at an intermediate point in the CATV system such as a Hub, or can be performed at the head end before the signals are processed by a CMTS at the head end system. In all cases, the methods are the same and the ability to perform this function digitally means that no additional losses in signal integrity beyond what would happen from theoretical arguments (i.e. normal signal to noise degradation) will occur. Because it is possible to design the CATV system using digital returns with SNR levels that cannot be obtained using analog fiber optic methods, it is therefore possible to start with signals that are so clean that significant levels of digital combining can be performed. This enables the system meet other objectives, such as cost reduction and signal grooming under changing system loads.

It is noted that the return link system shown in FIGS. 2 and 3 requires synthesizers in both the transmitter and the receiver, while the present invention uses a synthesizer only in the receiver, thereby lower the cost and increasing the reliability of the return path link.

Daisy Chain Version of Return Link System Using Summing RF Transmitters and Large Bandwidth Non-RF Data Channel Now that a complete description has been provided of a few embodiments of the present invention, a "daisy chain" embodiment shall be presented, as well as a number of alternate embodiments of the daisy chain embodiment. Whenever the daisy chain embodiment uses components whose function is the same as in previous embodiments, those components are labeled with the same reference numbers in the diagrams and explanations of the daisy chain embodiment(s), and furthermore the function and operation of such components shall be explained only to the extent necessary to understand their function and operation in the daisy chain embodiment(s).

Figure 14:
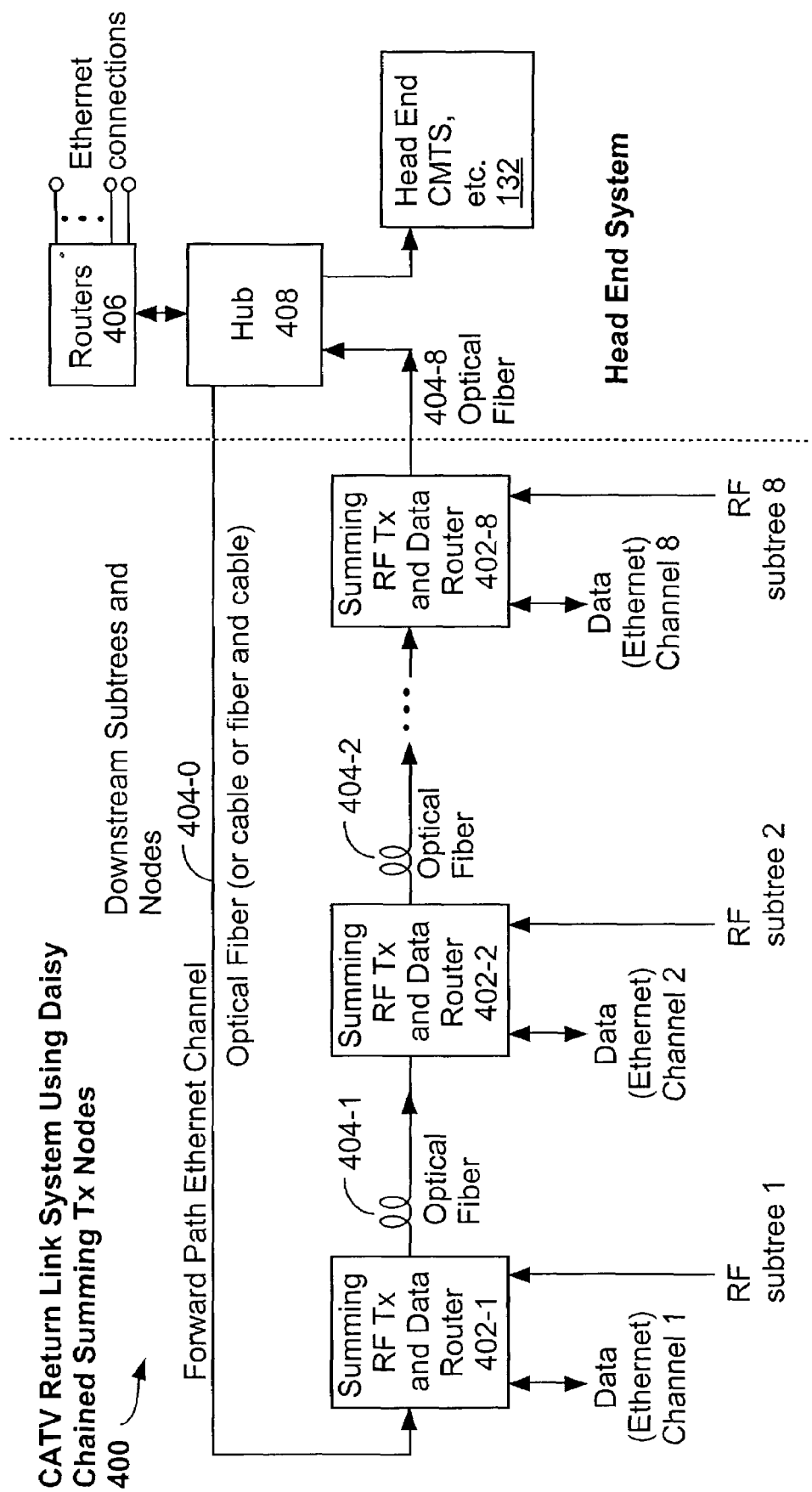
FIG. 14 a block diagram of CATV digital return path link system in which a plurality of the subtree return link transmitters are connected in a daisy chain.

FIG. 14 shows a CATV digital return path link system 400 in which a plurality of the subtree return link transmitters 402 are connected in a daisy chain, and which furthermore provide a set of large bandwidth digital channels in addition to providing a digital return path link for RF data. More specifically, in the embodiment shown the return links of up to eight subtrees of the CATV system are serviced by the "summing RF transmitters" 402, although the number of subtree RF transmitters may be more or less in other embodiments. Each summing RF transmitter 402 receives a data stream from a previous node as well as the RF data signal from a local subtree. The summing RF transmitter 402 sums the RF data in the received data stream with the RF data from the local subtree J (where J is an index that identifies the local subtree), converts the resulting data stream into an optical digital signal, and forwards the resulting optical digital signal over an optical fiber 404-J to a next node of the system. The first summing RF transmitter 402 in the daisy chain receives a data stream over an optical fiber 404-0 (or alternately over the main optical fiber and cable forward path) from a set of routers 406 at the head end of the system. This data stream will be described in more detail below. The last summing RF transmitter 402 in the daisy chain sends its output data stream to a hub 408 at the head end of the system.

By summing the RF data from multiple subtrees, the RF signals are superimposed on each other, and the resulting data stream represents the sum (also called the superposition) of these RF signals.

Each summing RF transmitter 402, in addition to sending RF data to the head end system, also receives, forwards and routes a set of large bandwidth data channels. In the exemplary embodiment, each summing RF transmitter 402 has a separate 100 Mb/s data channel, for instance implemented as an Ethernet channel. The data stream received by each RF transmitter includes a 100 Mb/s data channel for each subtree. The RF transmitter routes the data in its data channel to a router or other device (not shown) at the local node, and also inserts into this data channel a stream of data stream. Thus, the received data in the channel for the local node is "dropped" onto a local bus, and data provided by the local node is "added" to the channel. In most embodiments, it is expected that the non-RF data stream for each subtree will be a full duplex data channel having a bandwidth of at least 5 Mb/s. Alternately, the non-RF data stream may be implemented as a half-duplex data channel, conveying data only in the return path direction from each subtree to the head end system.

The supplemental data channel for each subtree return link transmitter 402 may be, for instance, a full duplex 10 Mb/s or 100 Mb/s Ethernet channel, and the connection to the return link transmitter 402 may be by made by a fiber optic, cable or wireless connection.

Bandwidth Allocation and Data Stream Structure

In a preferred embodiment of the system shown in FIG. 14, the data stream sent over the optical fibers 404 is sent at approximately 2.56 Gb/s, and that bandwidth is allocated as follows: 1.20 Gb/s is used for transmitting the RF data from all the subtrees as a combined, summed signal; 800 Mb/s is used for eight 100 Mb/s Ethernet data channels, one for each of eight subtree nodes; the RF data and Ethernet data streams are combined and 8b/10b encoded, resulting in a combined data stream of 2.5 Gb/s; and a maintenance data channel of up to 24 Mb/s (60 Mb/s including encoding and overhead bits) is used to transmit maintenance data from the RF transmitters to the head end system.

In one embodiment, the 24 Mb/s maintenance data channel is also used to send commands from the head end system (or from an intermediate hub between the RF transmitters and the head end system) to the RF transmitters. Examples of commands that may be sent by head end system (or by a hub) to any specified RF transmitter include: a command to send a sample of the RF data from its subtree via the maintenance data channel, a command to stop sending RF data from its local subtree (e.g., due to excessive ingress in that subtree), and a command to increase or decrease the gain of its RF input amplifier.

Figure 15:
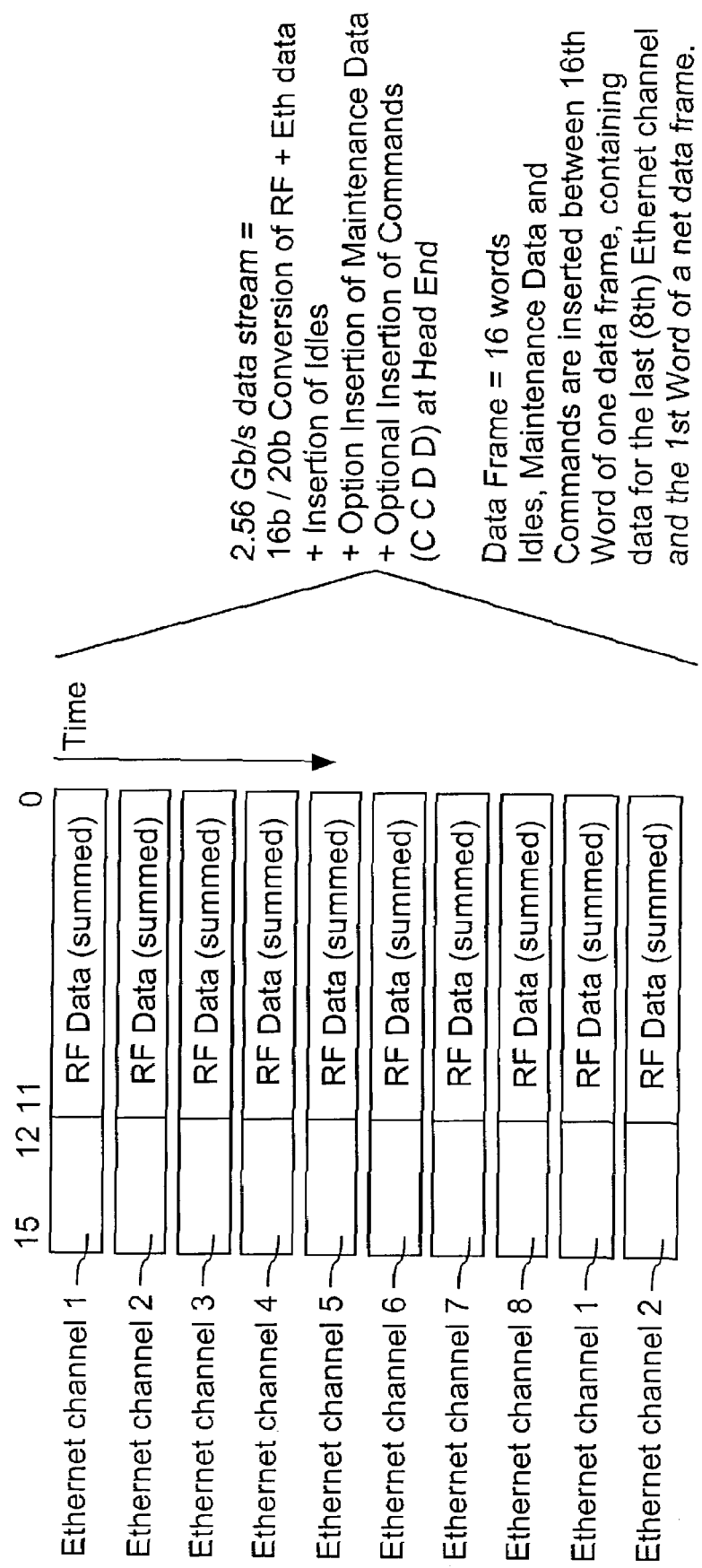
FIG. 15 depicts an example of the data structure of the data transmitted over the return link optical fiber by each of the subtree return link transmitters.

FIG. 15 depicts the data structure of the data transmitted over the return link optical fiber 404 by any one of the subtree return link transmitters 402. The data stream generated by the transmitted includes a sequence of 16-bit data words, a first portion of which represents an RF data sample and a second portion of which is non-RF data from one of the data channels. In the preferred embodiment, 12 bits of each data word represent one RF data sample and 4 bits are non-RF data from a data channel. When the number of data channels is N (e.g., eight), the data channel whose data is included in each data word is rotated in round robin fashion, giving each data channel an equal share of the 4-bit data sub-channel of the 16-bit data word channel. In other words, the non-RF data channels are time division multiplexed so as to occupy the 4-bit data sub-channel of the 16-bit data word channel.

As indicated in FIG. 15, each 16 bit data word is converted into a bit-balanced 20-bit word using either a standard or proprietary 8b/10b or 16b/20b conversion. In addition, as in the embodiment described earlier in this document, the 20-bit encoded data words are padded with either idles and maintenance data, when such maintenance data is available to produce the full data stream sent over the optical fibers 404 of the system.

The data stream sent over the forward path (down stream) optical fiber 404-0 has the same format as that shown in FIG. 15. However, the RF data in each data word is either set to a fixed value, such as zero, or is set to carry one or more low amplitude dithering "tones" of the type described above as being generated by the tone adder 225 (see FIG. 5 and the associated description). Furthermore, the data stream sent over the forward path 404-0 will typically not contain any maintenance data, and thus the RF data words will be padded with idles. However, as indicated earlier, in some embodiments the RF data words are padded with both idles and command data. For instance, command data may be sent between data frames by transmitting two carrier words followed by two command data words. The command data words, when accumulated, represent one or more commands. Each command includes a destination portion identifying which RF transmitter or transmitters are the destination of the command and a command portion specifying an action to be taken or a mode to be set in the identified RF transmitter or transmitters.

In a preferred embodiment of the return link system shown in FIG. 14, each data frame contains 16 data words. The first data word of each data frame contains data for the first non-RF data channel and the last data word of each data frame contains data for a last one of the non-RF data channels. Idles, maintenance data and commands are inserted between data frames using the same methodology as described above for the 1X and 2X return link transmitters. Each transition from an Idle to a Data word is indicative of the beginning of a data frame, and this transition is used to synchronize each summing return link transmitter 402 with the data stream received from the previous node.

It is to be understood that FIG. 15 represents just one example of how the bandwidth of an optical fiber could be allocated and how the data stream transmitted could be structured. As will be understood by those skilled in the art, there are an essentially unlimited number of ways that such bandwidth can be allocated between RF and non-RF data and there are also an essentially unlimited number of ways that the data stream can be structured. Many aspects of the present invention are independent of any particular bandwidth allocation and data stream structure.

Daisy Chain/Summing Subtree Return Link Transmitter

Figure 16:
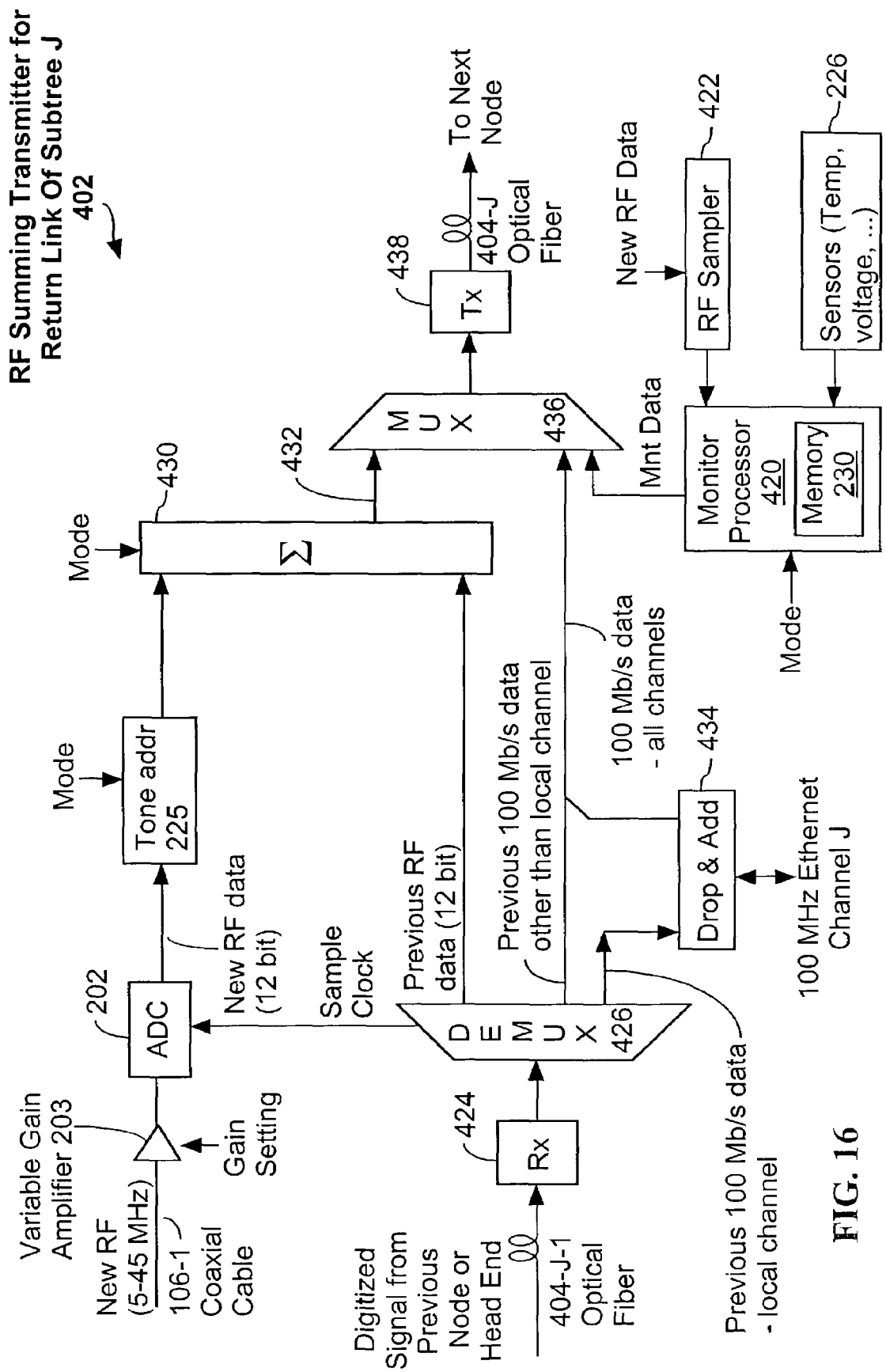
FIG. 16 is a block diagram of one of the subtree return link transmitters of the system shown in FIG. 14.

FIG. 16 shows a block diagram a subtree summing transmitters 402. As in the embodiments described earlier, the RF transmitter 402 includes a variable gain amplifier 203 for adjusting the signal level of the received RF signal, and an analog to digital converter 202 for sampling the analog RF signal at a rate determined by a sample clock. In this embodiment, the full twelve bits generated by the ADC 202 are used. A tone adder 225 may optionally be used to add a set of low amplitude dithering tones to the RF data signal, as described earlier.

The transmitter 402 also receives a digital data stream from a previous node via receiver 424. This data stream is received in parallel with the RF data from the local subtree. The received data stream includes digitized RF data from zero, one or more other subtrees of the system. The received data stream includes data from N (e.g., eight) non-RF data channels and maintenance data from a maintenance data channel. The various data channels within the received data stream are recognized and distributed by a demultiplexor 426. The demultiplexor 426 also recovers a sample clock from the received data stream, and that sample clock is used to drive the ADC 202 so as to generate RF data from the local tree at a rate that is synchronized with the data rate of data stream received from the previous node.

One output from the demultiplexor 426 is an RF data stream, containing twelve bit RF data samples in the preferred embodiment. This RF data stream is summed with the RF data for the local subtree by a summer 430 to generate a summed RF data signal on node 432.

Another output from the demultiplexor 426 is a non-RF data stream, containing N (e.g., eight) time division multiplexed data streams. Only one of the N data streams belongs to a particular local subtree, and a Drop/Add circuit 434 is used to extract the non-RF data stream from one TDM time slot of the non-RF data stream and to insert a new non-RF data stream into the same TDM time slot of the non-RF data stream.

Yet another output from the demultiplexor 426, not shown in FIG. 16, is the maintenance data stream (if any) contained within the received data stream. In another embodiment, a further output from the demultiplexor 426, not shown in FIG. 16, is a command data stream contained within the received data stream. These aspects of the demultiplexor 426 will be described below with reference to other figures.

As in the embodiments described earlier, the RF transmitter 402 may include a set of sensors 226 for monitoring temperature, voltages and other parameters of the transmitter 402. The sensor generated values are read by a processor 420, which also includes an internal memory device 230 for storing transmitter identifying information such as serial numbers, model numbers, software and hardware revisions, date of manufacture and the like of the transmitter 402. The processor periodically forwards the sensor generated values as the transmitter identifying information, herein collectively called maintenance data, to a FIFO memory device 229 (shown in FIG. 20). In a preferred embodiment forwards the maintenance data to the memory device 229 once every 40 ms.

In addition, the RF transmitter 402 preferably includes an RF data sampler 422 for inserting a stream of samples of the RF data from the local subtree into the maintenance data stream. In one embodiment the RF data sampler 422 is activated by a command sent from the head end system. In another embodiment the processor 420 is programmed to activate the RF data sampler 422 on a periodic basis, such as once per minute. When activated, the RF data sampler 422, in conjunction with the processor 420, generates a sufficient number of samples of the RF data from the local subtree to enable a computer or other device that receives the sampled RF data (via the maintenance data stream) to perform a Fourier analysis of that data, for instance to determine whether there is excessive ingress at the local subtree.

Figure 17:
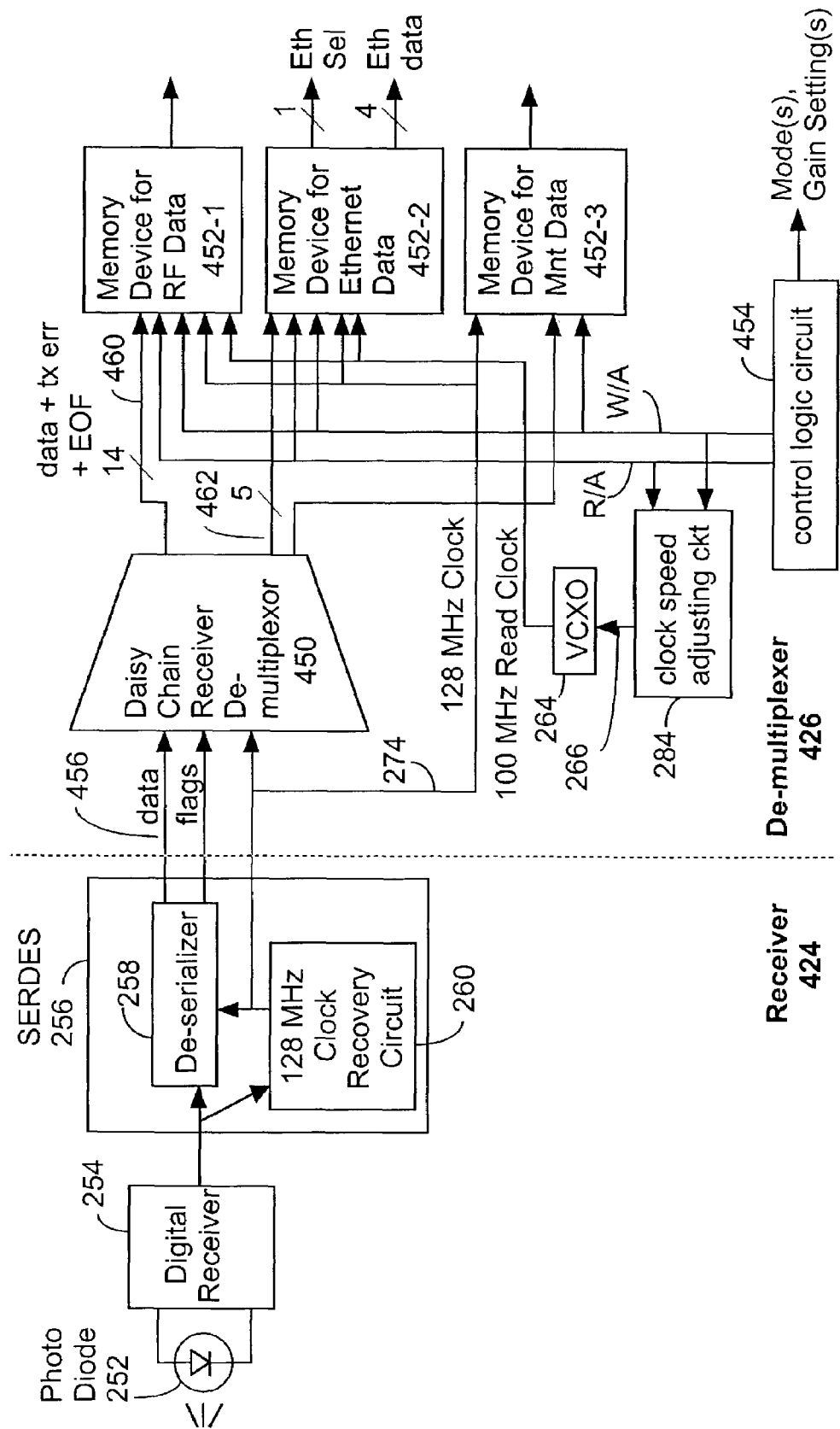
FIG. 17 is a block diagram of the receiver and demultiplexor of the subtree return link transmitter of FIG. 16.

FIG. 17 shows a preferred embodiment of the receiver 424 and demultiplexor 426 of the subtree return link transmitter of FIG. 16. The receiver 424 includes a fiber receiver 252, 254, deserializer circuit 258 and clock recovery circuit 260 that operate as described above with reference to FIG. 9. A daisy chain receiver demultiplexor 450 receives the data and flags recovered by the deserializer circuit 258 and identifies and demultiplexes that data for temporary storage in memory devices 452, which are used as FIFO's. The 12-bit RF data values, along with an EOF flag and transmission error flag for each received RF data word are stored in memory 452-1; the 4-bit non-RF data values and a 1-bit local content selection flag are stored in memory 452-2; and maintenance data in the received data stream is stored in memory 452-3.

The demultiplexer 426 includes a VCXO (voltage controlled crystal oscillator) 264 that generates a sample clock, and a clock speed adjusting circuitry 284 that operate in the same manner as described above with reference to FIG. 10. Control logic circuit 454 operates similar to the control logic circuit 283 of FIG. 10, except that it now stores all the RF data in one memory 452-1 and stores non-RF from a set of non-RF data channels in another memory 452-2. Also, this control logic circuit 454 generates a set of mode signals that control the operation of various circuits in the daisy chain summing RF transmitter 402 and may also generate a gain setting for the variable gain amplifier 203.

Figure 18:
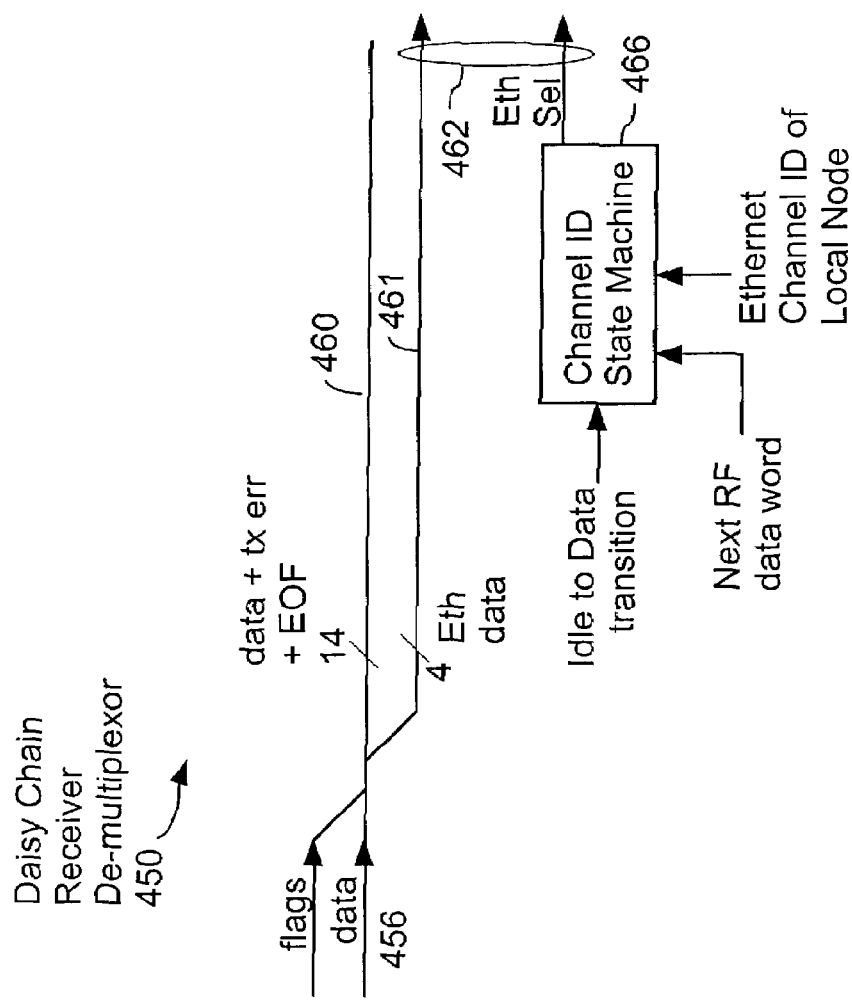
FIG. 18 is a block diagram of a portion of an embodiment of a daisy chain receiver demultiplexor used in the demultiplexer of FIG. 17.
Figure 20:
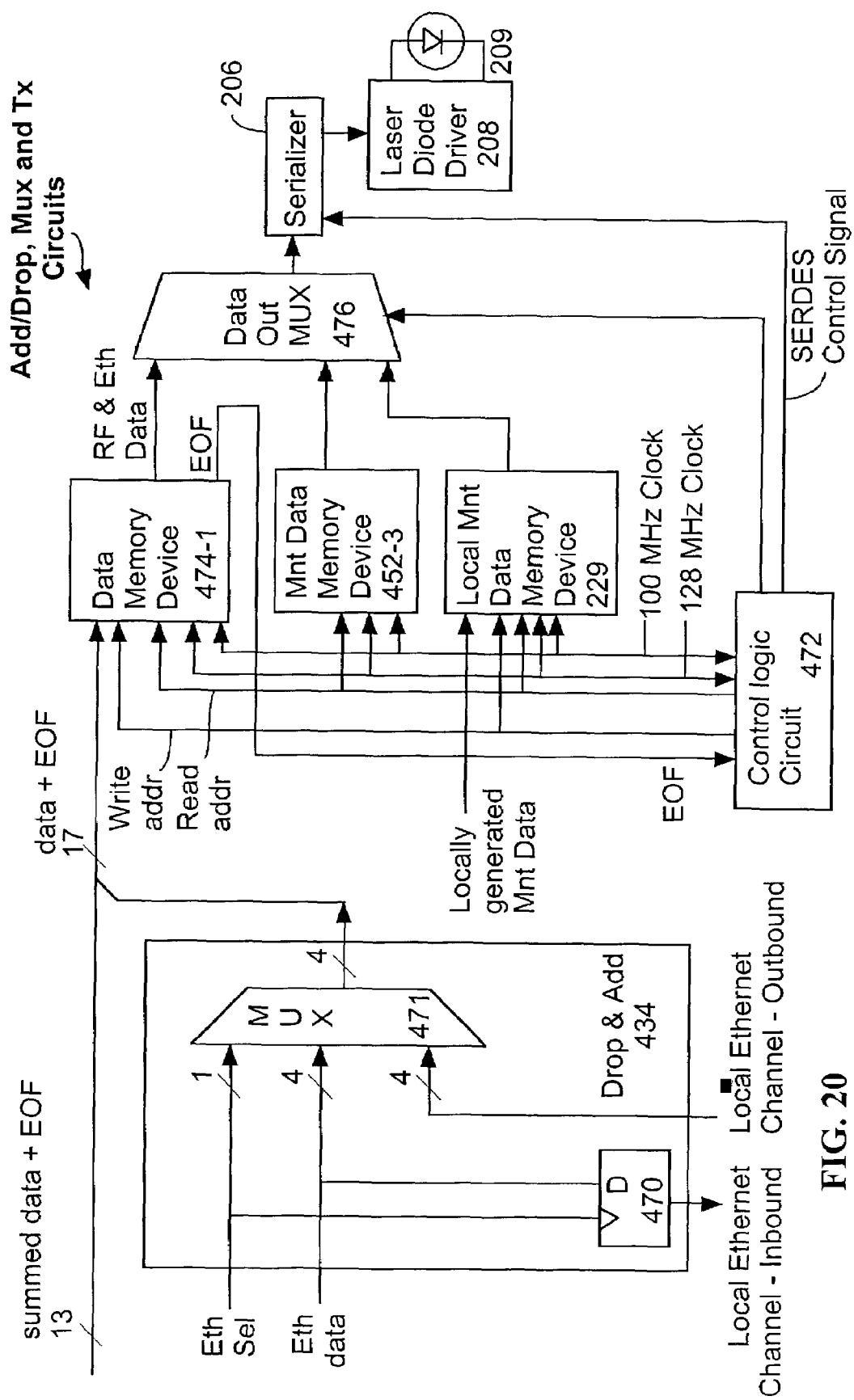
FIG. 20 is a block diagram of an embodiment of the drop/add circuit, multiplexer and transmitter of the subtree return link transmitter shown in FIG. 16.

FIG. 18 shows the portion of the daisy chain receiver demultiplexor 450 of FIG. 17 that generates the 1-bit local content selection flag, labeled "Eth Sel" in FIGS. 17, 18 and 20. As shown, the recovered data and flags are combined and separated, using "wired logic" (i.e., routing the various bit lines of the data and flag busses), to form a 14-bit "data+transmission error+EOF" bus 460 and a 4-bit "Ethernet data" bus 461.

Figure 19:
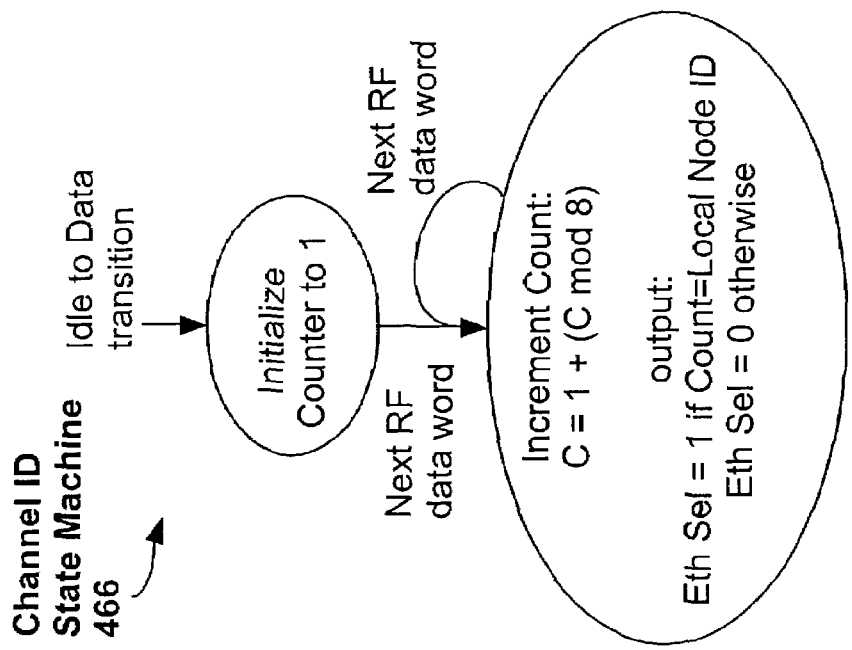
FIG. 19 is a state diagram for an digital data (Ethernet) ID state machine in the demultiplexer of FIG. 18.

A channel ID state machine 466 keeps track of which non-RF data channel is currently being processed. As shown in FIG. 19, whenever there is an Idle to Data word transition in the received data stream, the state machine is initialized so as to set the value generated by a cyclical TDM time slot counter to an initial value (e.g., 1). Once the state machine is initialized, it automatically increments the cyclical TDM time slot counter each time that a new RF data word is received by the daisy chain receiver demultiplexor 450. In addition, as shown in FIGS. 18 and 19, whenever the value generated by the cyclical TDM time slot counter matches the ID or index of the channel ID for the local node, the "Eth Sel" signal is set to a first value (e.g., 1) and is otherwise set to the opposite value (e.g., 0). The Eth Data and Eth Sel signals together form a 5-bit channel-marked data signal 462.

As will be understood by those skilled in the art, there are many other ways that the TDM time slots of the non-RF data channel could be marked and identified by the subtree return link transmitters, and many (if not all) of those methodologies would be consistent the architecture and operation of present invention.

FIG. 20 shows an embodiment of the drop/add circuit 434, multiplexer 436 and transmitter 438 of the subtree return link transmitter 402 shown in FIG. 16. The drop/add circuit 434 transmits the data on the Eth data bus onto an inbound local Ethernet channel, via a latch 470, when the Eth Sel signal is enabled (e.g., set to "1"), and also inserts data received from an outbound local Ethernet channel into the non-RF data stream, via a multiplexer 471, when the Eth Sel signal is enabled. During the time slots when the Eth Sel signal is not enabled, the non-RF data stream is passed by the multiplexer 471 unchanged.

The multiplexer 436 of FIG. 16 is implemented in a preferred embodiment using a control logic circuit 472 to control the writing of RF data and non-RF data into memory device 474-1. Control circuit 472 also writes locally generated maintenance data into a memory device 229. Furthermore, control circuit 472 controls the process of reading data from memory devices 474-1, 452-3 (maintenance data from previous nodes) and 229 (locally generated maintenance data) in a manner similar to that described above for control logic circuit 283 of FIG. 10. In particular, data words in memory 474 are read out for transmission through the data out multiplexer 476 whenever the fullness of memory 474 is above a threshold level. When the fullness of memory 474 is not above the threshold level, a set of four idle words are inserted between data frames if neither maintenance data memory 452-3 or 229 contains a set of maintenance data ready for transmission. When the fullness of memory 474 is not above the threshold level, and either maintenance data memory 452-3 or 229 contains a set of maintenance data ready for transmission, and idle word, a carrier word, and then two words of the maintenance data are transmitted between data frames from memory 474 via the multiplexer 476. Once transmission of a set of maintenance data from either maintenance data memory 452-3 or 229 begins, transmission of the maintenance data in that memory continues during the available slots between data frames (i.e., while the fullness of memory 474 is not above the threshold level) until the complete set of maintenance data has been sent.

The transmitter 438, composed of serializer 206 and laser diode driver 208 and laser 209, operates as described above with reference to FIG. 7.

Figure 21:
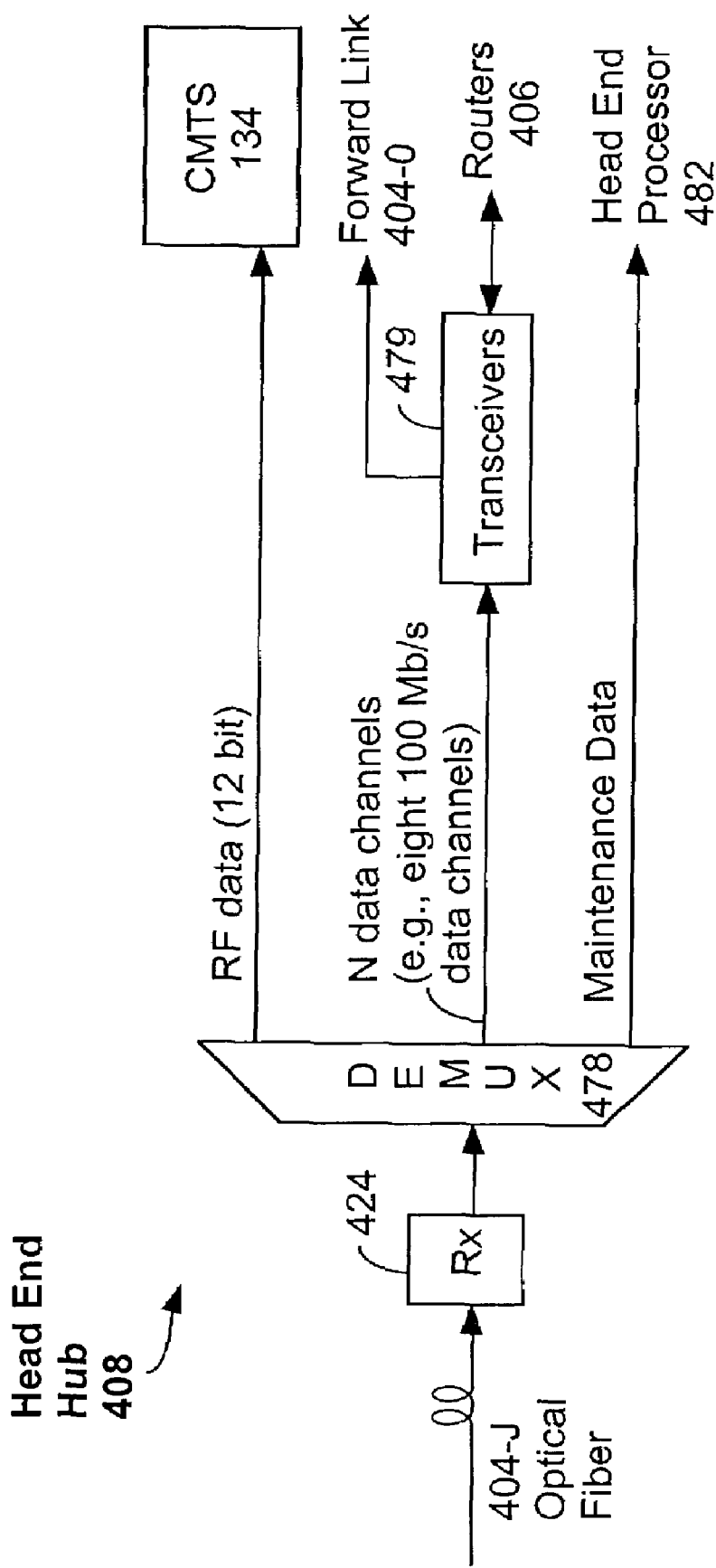
FIG. 21 is a block diagram of a hub for separating an RF data stream from a set of non-RF data streams at a CATV head end system.

An embodiment of the hub 408 in the head end system is shown in FIG. 21. The hub includes a receiver 424, for receiving the return link data stream from the last subtree return link transmitter in the system, and a demultiplexor 478 for separating out the RF data stream, the non-RF data streams and maintenance data from each other. Receiver 424 is shown in FIG. 17 and operates in the same manner as the receiver 424 in the subtree return link transmitter. The demultiplexor 478 routes the RF data stream to a CMTS 134 at the head end, routes the non-RF data streams to a set of transceivers 479, each of which exchanges data with a corresponding router 406 (e.g., Ethernet router), and routes maintenance data to a processor 482 at the head end for analysis. Each transceiver 479 sends one of the non-RF data streams to a corresponding router and receives a non-RF data stream from that router. The routers 406 may be conventional data network routers, such as 10 Mb/s or 100 Mb/s Ethernet routers. The cable modem termination system (CMTS) 134 receives the RF data stream representing the summed samples of multiple distinct subtree RF signals and reconstructs therefrom digital messages encoded within each of the subtree RF signals. Since the CMTS 134 is a product that has been used for a number of years to process return path signals in many cable television systems, its structure and operation are not described here.

Sending Commands Downstream to Subtree Return Link Transmitters

In some embodiments of the present invention commands are sent by the head end system, or by an intermediary hub, so as to control the operation of the subtree return link transmitters. The need for head end control of the subtree return link transmitters potentially applies to all the embodiments described above. For instance, the commands sent by the head end system are received by a control logic circuit 227 (shown in FIG. 5) which uses the commands to set the gain of the amplifiers 203, as well as to set the mode of other components of the transmitter 200.

Figure 22:
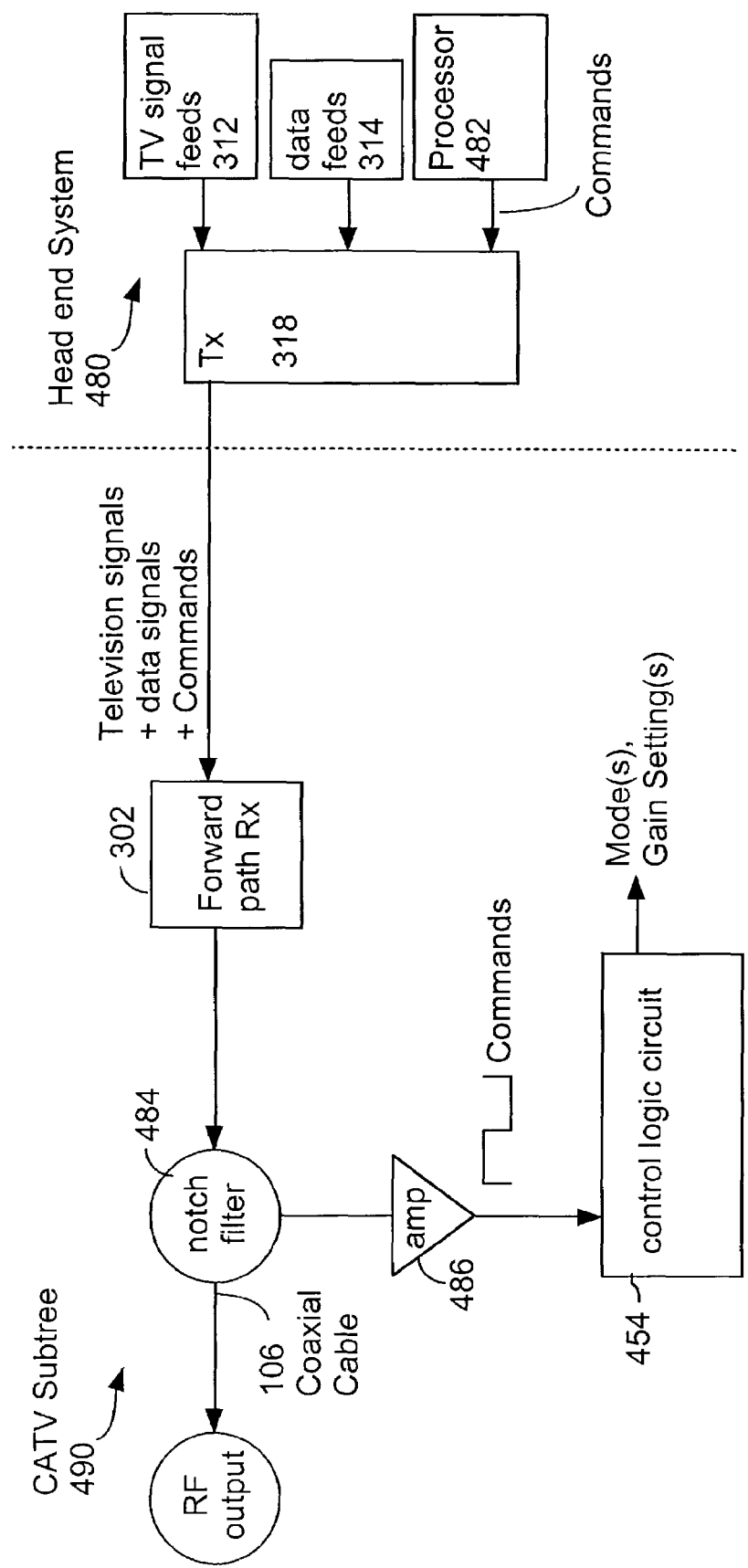
FIG. 22 is a block diagram of a system for sending commands to the return path transmitters of multiple subtrees of a cable television network.

FIG. 22 shows a system for sending commands to the return path transmitters of multiple subtrees via the main forward link of the cable television network. In this embodiment, the head end system 480 includes a processor 482, typically a computer, that injects command data packets into the main forward link via the head end transmitter 318. The commands, along with television signals and data feeds, are received by the forward path receiver 302 of each subtree in the system. The command packets are preferably transmitted at a carrier frequency not used by other signals in the system, and therefore a notch filter 484 is used to extract the command packets, and an amplifier 486 is used to convert the extracted signal into a data signal that can be received and interpreted by the control logic circuit 454 of the subtree return link transmitter.

Figure 23:
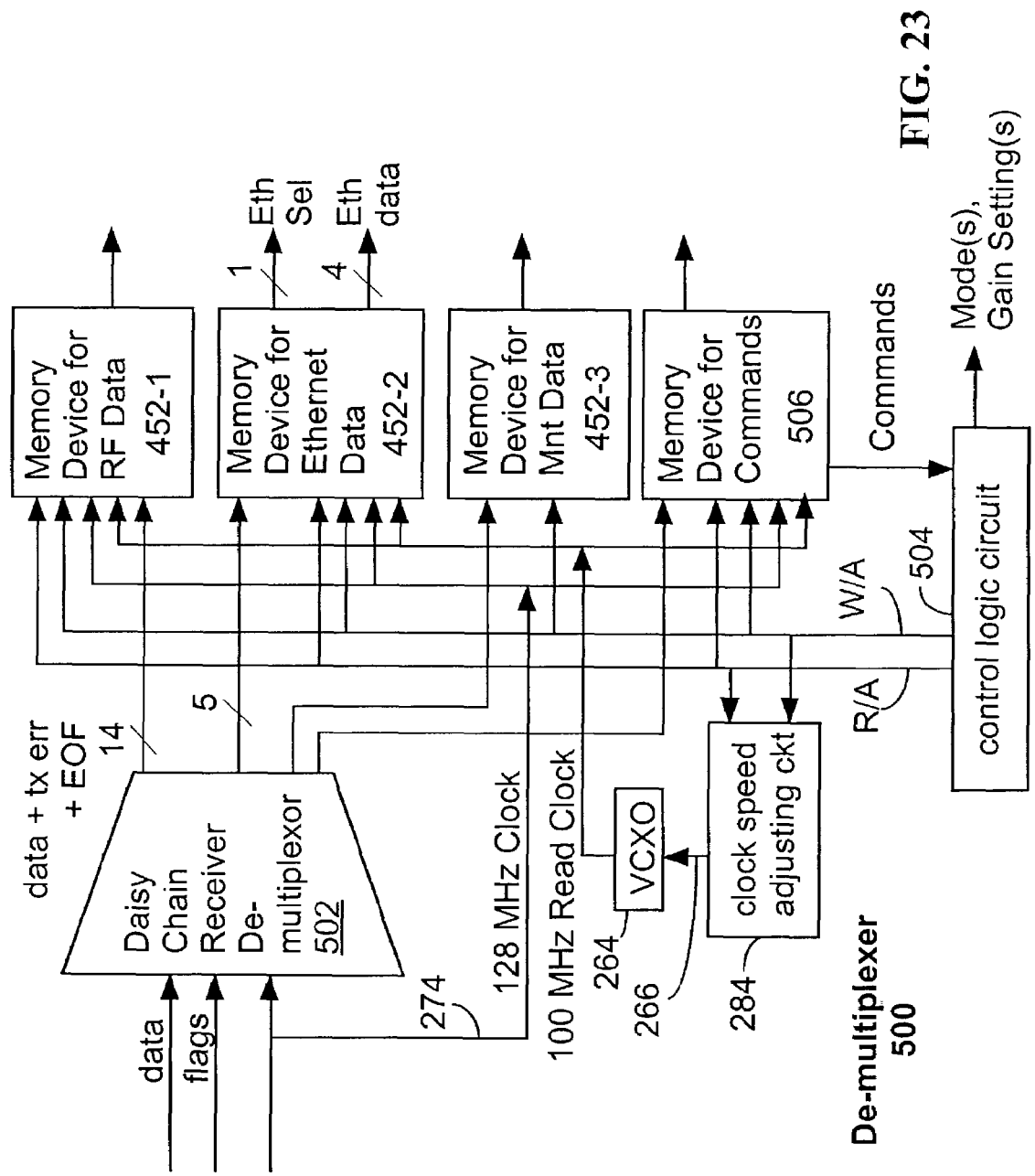
FIG. 23 is a block diagram of an alternate embodiment of the demultiplexor of FIG. 17 having additional circuitry for receiving commands, such as commands sent by a head end processor, embedded in a data stream received from the head end of a CATV system.

FIG. 23 shows an alternate embodiment of the demultiplexor of FIG. 17 having additional circuitry for receiving commands, such as commands sent by a head end processor, embedded in a data stream received from the head end of a CATV system. In this embodiment, the 24 Mb/s maintenance data channel is used to send commands from the head end system (or from an intermediate hub between the RF transmitters and the head end system) to the RF transmitters via the downlink Ethernet channel 404-0 shown in FIG. 14. Examples of commands that may be sent by the head end system (or by a hub) to any specified RF transmitter include: a command to send a sample of the RF data from its subtree via the maintenance data channel, a command to stop sending RF data from its local subtree (e.g., due to excessive ingress in that subtree), and a command to increase or decrease the gain of its RF input amplifier. The command data is preferably sent between data frames by transmitting two carrier words followed by two command data words. The command data words, when accumulated, represent one or more commands. Each command includes a destination portion identifying which RF transmitter or transmitters are the destination of the command and a command portion specifying an action to be taken or a mode to be set in the identified RF transmitter or transmitters. The destination portion may be implemented as an index value identifying a particular node, or as a bit map identifying one or more nodes as the destination of the command. The command portion may be implemented in using a conventional "op code+operand" format, or any other suitable format.

The demultiplexor 500 includes a receiver demultiplexor 502 that recognizes commands embedded in the maintenance data stream and stores them in a memory device 506. If the command is directed only to the subtree return link transmitter in which it has been received, it is processed by the control logic circuit 504 in the demultiplexor 500 and is not forwarded to the next subtree node. If the command is not directed to the subtree return link transmitter in which it has been received, or it is also directed to additional subtree return link transmitters, the command is forwarded to the next subtree node via the data out multiplexer 476 shown in FIG. 20.

Automatic Gain Control and Ingress Detection and Control

In any of the embodiments described above that include the ability to send commands from the head end system to the subtree return link transmitters, the head end system can optimize the input amplifier gain setting of each subtree return link transmitters as follows. First, the head end system monitors the RF data signal from the subtree. In the 2X and 1X return link transmitters, the RF data signal from each subtree is received at the head end as a distinct signal, and thus the energy level in the RF data signal can be analyzed by a processor at the head end. In the daisy chain embodiment, each subtree return link transmitter can be instructed to send an RF data sample to the head end via the maintenance data channel.

In one embodiment, a number of threshold levels are defined and then used to determine how to adjust the gain of the RF input amplifier 203 (FIG. 4) for each subtree return link transmitter. When the energy level in the RF data signal for a particular subtree is found to be below a first threshold, a command is sent to the subtree return link transmitter to adjust the input amplifier gain upwards, for instance by 6 dB, so as to boost the power of the RF data signal. This has the effect of improving the signal to noise ratio for the subtree without having to modify any of the equipment in the system. When the energy level in the RF data signal for a particular subtree is found to be above a second threshold, indicating that data clipping may be occurring, a command is sent to the subtree return link transmitter to adjust the gain of the RF input amplifier downwards, for instance by 3 dB or 6 dB, so as to reduce the power of the RF data signal and to avoid data clipping. Each subtree return link identifier is preferably provided with the ability to set the input amplifier gain to at least three distinct gain levels, and preferably five distinct gain levels, in response to commands sent by the head end system.

In addition to monitoring RF power, in a preferred embodiment a processor in the head end system is configured to periodically perform a Fourier analysis of the RF data received from each subtree and to automatically detect ingress problems. When an ingress problem is detected, an operator of the system is notified. The operator of the system can then send a command, via the head end system, to the subtree return link transmitter to either stop sending RF data to the head end, or to adjust the RF input amplifier gain so as to reduce the impact of the ingress problem. Alternately, if the ingress problem detected by the processor in the head end system is sufficiently severe, a command to stop sending RF data to the head end or a command to adjust the gain of the RF input amplifier may be automatically sent to the return link transmitter for the subtree having the ingress problem at the same time that a notification is sent to the system operator.

Alternate Embodiments

Figure 24:
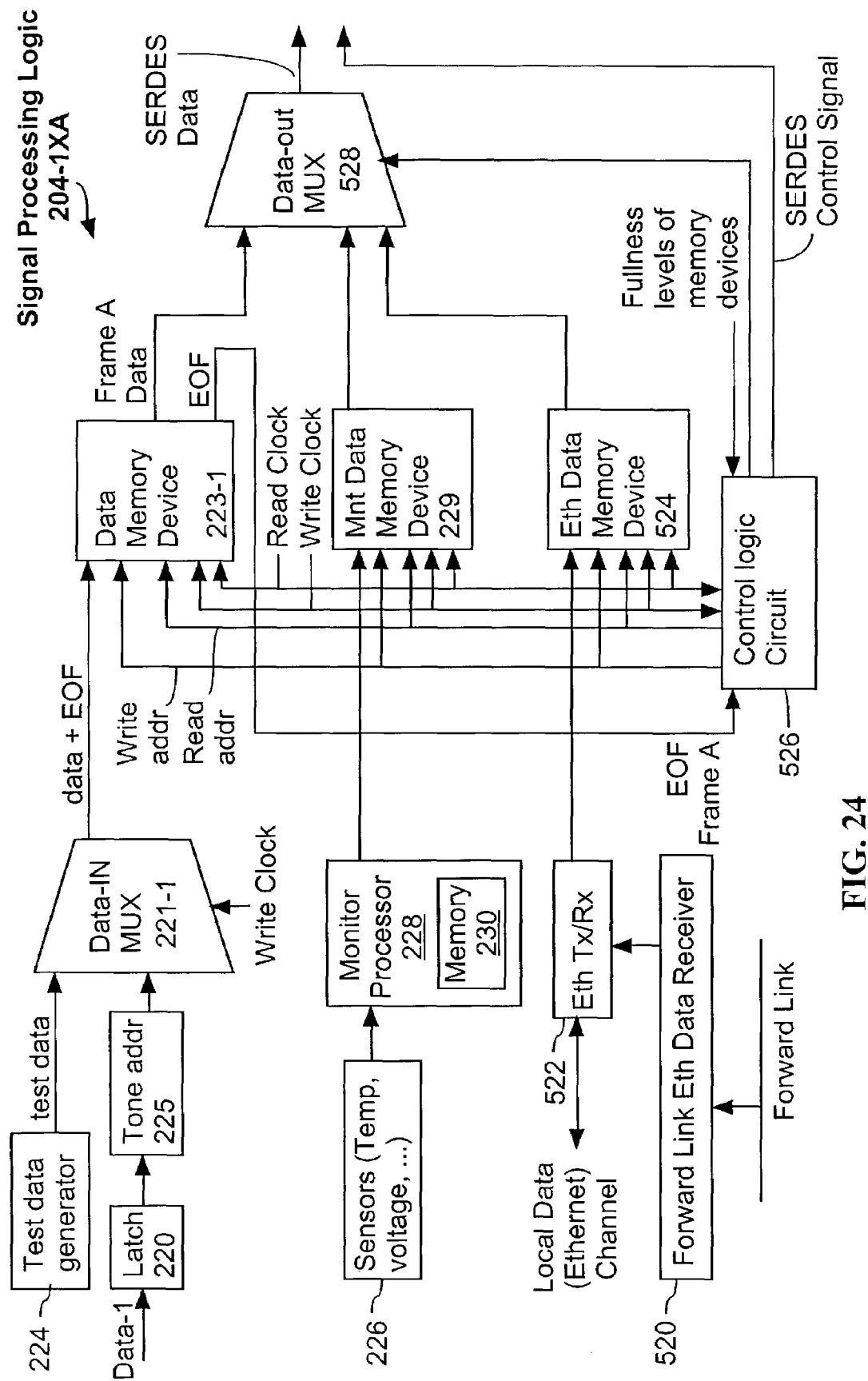
FIG. 24 is an alternate embodiment of the signal processing circuitry shown in FIG. 8, with additional circuitry for interleaving a non-RF data stream with the digitized RF data stream representing the received analog RF data signal.

Many alternate embodiments of the present invention may be obtained by either modifying various parameters, such as data rates, bit lengths, other data structures, and so on, as well as by combining features of the various embodiments described above. For instance, the non-RF data channel feature of the "daisy chain" embodiment (shown in FIGS. 14-20) may be used in the 1X and 2X subtree transmitter embodiments. As shown in FIG. 24, the signal processing circuitry of FIG. 8 has been supplemented with additional circuitry for interleaving a non-RF data stream with the digitized RF data stream representing the received analog RF data signal. In particular, a non-RF data stream on the forward link is extracted by an Ethernet data receiver 520 and passed to a transceiver 522. The transceiver 522 forwards the inbound non-RF data stream to a local data channel. Outbound data from the local data channel is forwarded to a memory device 524 for buffering. A control logic circuit 526 and data out multiplexor 528 combine the RF and non-RF data, for instance in a manner similar to that shown in FIG. 15, and then interleave the combined data with maintenance data for transmission on the return link. Alternately, the RF and non-RF data may be transmitted in separate data frames that are interleaved, along with the maintenance data, on the return link.

Figure 25:
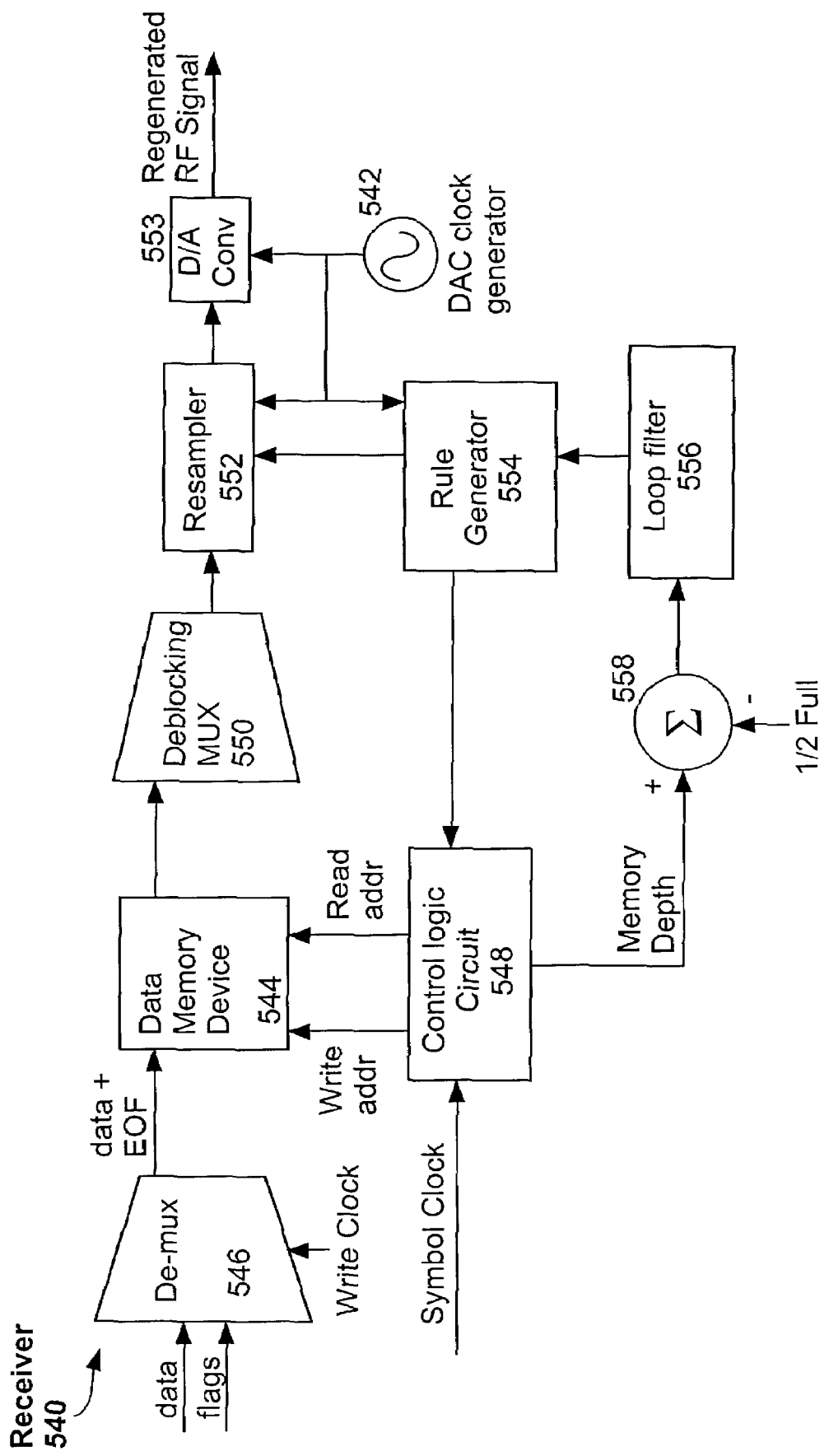
FIG. 25 shows a receiver that uses a resampler to regenerate an RF signal.

FIG. 25 shows an alternate embodiment of a receiver 540, such as a receiver at the head end system, that uses a DAC clock generator 542 that is not synchronized with the sample clock of the transmitter and whose clock rate is not tuned in accordance with the fullness of the RF data buffer memory 544. Data and flags are recovered from the inbound digital optical signals and a receiver demultiplexer 546 stores the RF data stream in buffer memory 544, as described above with respect to the other embodiments of the receiver. A control logic circuit 548 generates the write address for storing RF data in memory 544 and also generates read address for reading the RF data back out of the memory 544. The control logic circuit 548 also generates a memory depth signal, based on the current read and write addresses.

A resampler 552 receives the RF samples from the memory 544 via a deblocking circuit 550, similar to the deblocking circuits described above. The purpose of the resampler 552 is to generate an interpolated value, based on a set of the received RF data values, that represents the value of the original/sampled RF signal at a point in time corresponding to the next cycle of the DAC clock. The interpolated value is presented to the DAC 553, which generates the regenerated RF signal. The rate of the DAC clock is not the same as the sample clock at the transmitter. The difference in clock rates may be small, such as where the DAC clock is set to be close to, but not precisely the same as the sample clock, or the difference may be large, such as were the DAC clock rate is set to a higher rate than the transmitter's sample clock such as rate that is about twice the sample rate. The resampler 552 performs the data interpolation in accordance with a "rule," which may be represented by a set of interpolation coefficients, generated by a rule generator 554. The rule generator 554, in turn, updates the rule over time in accordance with a loop filter signal generated by a loop filter 556 that filters the difference between the memory depth signal and a predefined fullness level (produced by adder 558). The resampling rule is updated at each DAC clock cycle. The loop filter 556, rule generator 554 and resampler 552 perform in the digital domain what is in effect a sampling clock synchronization with the transmitter, but without actually adjusting the clock rate of the DAC clock. An important characteristic of this embodiment of the receiver is that the RF signal is accurately regenerated, with extremely low jitter, because the local DAC clock is not affected by jitter in the clock recovered by the optical fiber digital signal receiver (not shown in FIG. 25). Also, the DAC clock generator 542 can be a much lower cost oscillator component than the VCXO used in the other receiver embodiments because the DAC clock does not need to be precisely tuned to the transmitter sample rate.

It is noted that many other specific frequency values other than those used in the preferred embodiments described herein could be used in systems implementing the present invention. Similarly, other data formats than those described could be used, as could other circuit configurations, and other SERDES circuits than those mentioned herein.

While the preferred embodiments are described as using Ethernet data channels, in other embodiments the data channels transported along with the RF data channel(s) may be ATM, SONET, Fibre Channel or other types of data channels.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A return path transmitter for use in conjunction with a local system that generates an analog RF data signal to be conveyed to a head end system, the return path transmitter comprising:

a sample clock generator having a first clock oscillator for generating a sample clock;

an RF signal receiver, coupled to the sample clock generator, for receiving and converting the analog RF data signal into a first data stream of digitized RF data samples at a rate determined by the sample clock;

supplemental channel circuitry for providing a second data stream;

a multiplexor coupled to the RF signal receiver and the supplemental channel circuitry to receive the first data stream and second data stream and to output a combined data stream;

an output clock generator having a second clock oscillator for generating an output clock;

an optical transmitter for converting the combined data stream into a serialized optical data signal for transmission over an optical fiber at a rate determined by the output clock;

a first memory device configured to buffer the first data stream; and a second memory device configured to buffer the second data stream;

wherein:

the sample clock has an associated sample rate;

the second data stream is generated by the supplemental channel circuitry at a rate that is less than the sample rate;

the multiplexor is configured to monitor a fullness level of the first memory device, output data stored in the first memory device in a first mode when the fullness level of the first memory device is more than a predefined threshold level, and to output data stored in the first memory device and data stored in the second memory device in a second interleaved mode when the fullness level of the first memory device is less than the predefined threshold level.

2. The return path transmitter of claim 1, wherein:

the supplemental channel circuitry generates maintenance data indicative of an operational state of the return path transmitter.

3. The return path transmitter of claim 1, wherein:

the first memory device comprises a dual ported random access memory device.

4. The return path transmitter of claim 1, wherein: the supplemental channel circuitry include an RF data sampler for sampling data from the first data stream to generate a set of sampled RF data and circuitry for including the sampled RF data in the second data stream.

5. The return path transmitter of claim 1, wherein:

the supplemental channel circuitry is configured to generate the second data stream intermittently;

the optical transmitter includes circuitry for inserting padding words into the combined data stream so as to maintain the combined data stream at a fixed data rate.

6. A return path transmitter for use in conjunction with a local system that generates an analog RF data signal to be conveyed to a head end system, the return path transmitter comprising:

a sample clock generator having a first clock oscillator for generating a sample clock;

an RF signal receiver, coupled to the sample clock generator, for receiving and converting the analog RF data signal into a first data stream of digitized RF data samples at a rate determined by the sample clock;

supplemental channel circuitry for providing a second data stream;

a multiplexor coupled to the RF signal receiver and the supplemental channel circuitry to receive the first data stream and second data stream and to output a combined data stream;

an output clock generator having a second clock oscillator for generating an output clock;

an optical transmitter for converting the combined data stream into a serialized optical data signal for transmission over an optical fiber at a rate determined by the output clock;

a port for receiving a third data stream from a source external to the return path transmitter, the third data stream having a data rate of at least 5 Mb/s; and merge circuitry for merging the first and third data streams into a merged data stream; wherein the multiplexor is coupled to the merge circuitry and the supplemental channel circuitry to receive the merged data stream and second data stream and to output the combined data stream.

7. The return path transmitter of claim 6, including:

a first memory for buffering the merged data stream; and a second memory device configured to buffer the second data stream;

wherein:

the sample clock has an associated sample rate;

the second data stream is generated by the supplemental channel circuitry at a rate that is less than the sample rate;

the multiplexor is configured to monitor a fullness level of the first memory device, output data stored in the first memory device in a first mode when the fullness level of the first memory device is more than a predefined threshold level, and to output data stored in the first memory device and data stored in the second memory device in a second interleaved mode when the fullness level of the first memory device is less than the predefined threshold level.

8. The return path transmitter of claim 6, wherein:

the supplemental channel circuitry generates maintenance data indicative of an operational state of the return path transmitter.

9. The return path transmitter of claim 8, wherein:

the supplemental channel circuitry includes at least one sensor for measuring an operational parameter selected from a group consisting of temperature and supply voltage.

10. The return path transmitter of claim 8, wherein: the supplemental channel circuitry includes an RF data sampler for sampling data from the first data stream to generate a set of sampled RF data and circuitry for including the sampled RF data in the second data stream.

11. The return path transmitter of claim 6, wherein: the supplemental channel circuitry includes:

an RF data sampler for sampling data from the first data stream to generate a set of sampled RF data; and circuitry for including the sampled RF data in the second data stream.

12. The return path transmitter of claim 6, wherein:

the supplemental channel circuitry is configured to generate the second data stream intermittently; and the optical transmitter includes circuitry for inserting padding words into the combined data stream so as to maintain the combined data stream at a fixed data rate.

13. A return path transmitter for use in conjunction with a local system that generates an analog RF data signal to be conveyed to a head end system, the return path transmitter comprising:

a sample clock generator having a first clock oscillator for generating a sample clock;

an RF signal receiver, coupled to the sample clock generator, for receiving and converting the analog RF data signal into a first data stream of digitized RF data samples at a rate determined by the sample clock;

supplemental channel circuitry for providing a second data stream, the supplemental channel circuitry configured to generate maintenance data indicative of an operational state of the return path transmitter and including the maintenance data in the second data stream, the supplemental channel circuitry including at least one sensor for measuring an operational parameter selected from a group consisting of temperature and supply voltage;

a multiplexor coupled to the RF signal receiver and the supplemental channel circuitry to receive the first data stream and second data stream and to output a combined data stream; and an output clock generator having a second clock oscillator for generating an output clock;

an optical transmitter for converting the combined data stream into a serialized optical data signal for transmission over an optical fiber at a rate determined by the output clock.

14. The return path transmitter of claim 13, wherein: the supplemental channel circuitry includes:

an RF data sampler for sampling data from the first data stream to generate a set of sampled RF data; and circuitry for including the sampled RF data in the second data stream.

15. The return path transmitter of claim 13, wherein:

the supplemental channel circuitry is configured to generate the second data stream intermittently; and the optical transmitter includes circuitry for inserting padding words into the combined data stream so as to maintain the combined data stream at a fixed data rate.

16. A return path transmitter for use in conjunction with a local system that generates an analog RF data signal to be conveyed to a head end system, the return path transmitter comprising:

a sample clock generator having a first clock oscillator for generating a sample clock;

an RF signal receiver, coupled to the sample clock generator, for receiving and converting the analog RF data signal into a first data stream of digitized RF data samples at a rate determined by the sample clock;

supplemental channel circuitry for providing a second data stream, the supplemental channel circuitry configured to generate maintenance data indicative of an operational state of the return path transmitter and including the maintenance data in the second data stream, the supplemental channel circuitry including an internal memory device configured to store data including at least one of a serial number, model number, date of manufacture, software revision number and hardware revision number of the transmitter, the supplemental channel circuitry being configured to include at least a portion of the data stored in the internal memory device in the maintenance data;

a multiplexor coupled to the RF signal receiver and the supplemental channel circuitry to receive the first data stream and second data stream and to output a combined data stream;

an output clock generator having a second clock oscillator for generating an output clock; and an optical transmitter for converting the combined data stream into a serialized optical data signal for transmission over an optical fiber at a rate determined by the output clock.

17. The return path transmitter of claim 16, wherein: the supplemental channel circuitry includes:

an RF data sampler for sampling data from the first data stream to generate a set of sampled RF data; and circuitry for including the sampled RF data in the second data stream.

18. The return path transmitter of claim 16, wherein:

the supplemental channel circuitry is configured to generate the second data stream intermittently; and the optical transmitter includes circuitry for inserting padding words into the combined data stream so as to maintain the combined data stream at a fixed data rate.

19. A return path transmitter for use in conjunction with first and second local systems that generate first and second respective analog RF data signals to be conveyed to a head end system, the return path transmitter comprising:

a sample clock generator for generating a sample clock;

first and second RF signal receivers, coupled to the sample clock generator, for receiving and converting the first and second respective analog RF data signals into first and second data streams of digitized RF data samples at a rate determined by the sample clock;

supplemental channel circuitry for providing a third data stream;

a multiplexor coupled to the RF signal receivers and the supplemental channel circuitry to receive the first, second and third data streams and to output a combined data stream;

an optical transmitter for converting the combined data stream into a serialized optical data signal for transmission over an optical fiber;

a first memory device configured to buffer the first data stream;

a second memory device configured to buffer the second data stream;

a third memory device configured to buffer the third data stream; and an output clock generator for generating an output clock; wherein:

the sample clock has an associated sample rate;

the third data stream is generated by the supplemental channel circuitry at a rate that is less than the sample rate;

the multiplexor is configured to monitor a fullness level of the first memory device, output data stored in the first and second memory devices in a first mode when the fullness level of the first memory device is more than a predefined threshold level, and to output data stored in the first and second memory devices and data stored in the third memory device in a second interleaved mode when the fullness level of the first memory device is less than the predefined threshold level.

20. The return path transmitter of claim 19, wherein:

the supplemental channel circuitry generates maintenance data indicative of an operational state of the return path transmitter.

21. The return path transmitter of claim 19, wherein:

the first memory device comprises a dual ported random access memory device.

22. A method of transmitting data representing an analog RF signal generated at a local system, comprising:

generating a sample clock having an associated sample rate;

receiving and converting the analog RF signal into a first data stream of digitized RF data samples at the sample rate determined by the sample clock;

providing a second data stream, the second data stream being provided at a rate that is less than the sample rate;

combining the first data stream and second data stream to generate a combined data stream;

converting the combined data stream into a serialized optical data signal for transmission over an optical fiber;

generating maintenance data indicative of an operational state of a return path transmitter;

including the maintenance data in the second data stream;

locally storing data including at least one of a serial number, model number, date of manufacture, software revision number and hardware revision number of the transmitter, and including in the second data stream at least a portion of the locally stored data.

23. The method of claim 22, including:

sampling data from the first data stream to generate a set of sampled RF data and including the sampled RF data in the second data stream.

24. The method of claim 22, wherein the second data stream is provided intermittently; and the method further comprises inserting padding words into the combined data stream so as to maintain the combined data stream at a fixed data rate.

25. A method of transmitting data representing an analog RF signal generated at a local system, comprising:

generating a sample clock having an associated sample rate;

receiving and converting the analog RF signal into a first data stream of digitized RF data samples at the sample rate determined by the sample clock;

providing a second data stream, the second data stream being provided at a rate that is less than the sample rate;

receiving a third data stream from a source external to a return path transmitter, the third data stream having a data rate of at least 5 Mb/s;

merging the first and third data streams into a merged data stream;

combining the merged data stream and second data stream to generate a combined data stream;

generating an output clock having an associated output rate; and converting the combined data stream into a serialized optical data signal for transmission over an optical fiber at the output rate associated with the output clock;

buffering the merged data stream in a first memory device;

buffering the second data stream in a second memory device;

monitoring a fullness level of the first memory device; and outputting data stored in the first memory device in a first mode when the fullness level of the first memory device is more than a predefined threshold level, and outputting data stored in the first memory device and data stored in the second memory device in a second interleaved mode when the fullness level of the first memory device is less than the predefined threshold level.

26. A method of transmitting data representing an analog RF signal generated at a local system, comprising:

generating a sample clock having an associated sample rate;

receiving and converting the analog RF signal into a first data stream of digitized RF data samples at the sample rate determined by the sample clock;

providing a second data stream, the second data stream being provided at a rate that is less than the sample rate;

combining the first data stream and second data stream to generate a combined data stream;

generating an output clock having an associated output rate;

converting the combined data stream into a serialized optical data signal for transmission over an optical fiber at the output rate associated with the output clock;

buffering the first data stream in a first memory device;

buffering the second data stream in a second memory device;

monitoring a fullness level of the first memory device; and outputting data stored in the first memory device in a first mode when the fullness level of the first memory device is more than a predefined threshold level, and outputting data stored in the first memory device and data stored in the second memory device in a second interleaved mode when the fullness level of the first memory device is less than the predefined threshold level.

27. A method of transmitting data representing first and second analog RF signals generated at first and second local systems, comprising:

generating a sample clock having an associated sample rate;

receiving and converting the first and second respective analog RF data signals into first and second data streams of digitized RF data samples at the sample rate determined by the sample clock;

providing a third data stream;

combining the first, second and third data streams to generate a combined data stream;

generating an output clock having an associated output rate;

converting the combined data stream into a serialized optical data signal for transmission over an optical fiber at the output rate associated with the output clock;

buffering the first data stream in a first memory device;

buffering the second data stream in a second memory device;

buffering the third data stream in a third memory device;

monitoring a fullness level of the first memory device; and outputting data stored in the first and second memory devices in a first mode when the fullness level of the first memory device is more than a predefined threshold level, and outputting data stored in the first and second memory devices and data stored in the third memory device in a second interleaved mode when the fullness level of the first memory device is less than the predefined threshold level.

* * * * *

UNITED STATES PATENT AND TRADEMARK OFFICE
CERTIFICATE OF CORRECTION

PATENT NO. : 7,257,328 B2
APPLICATION NO. : 09/735710
DATED : August 14, 2007
INVENTOR(S) : Levinson et al.

It is certified that error appears in the above-identified patent and that said Letters Patent is hereby corrected as shown below:

Drawings
Sheet 4, replace Figure 5 with the figure depicted below, wherein Tone addr is relabeled 225-1 and "Test data generator" is renamed "Test signal generator"

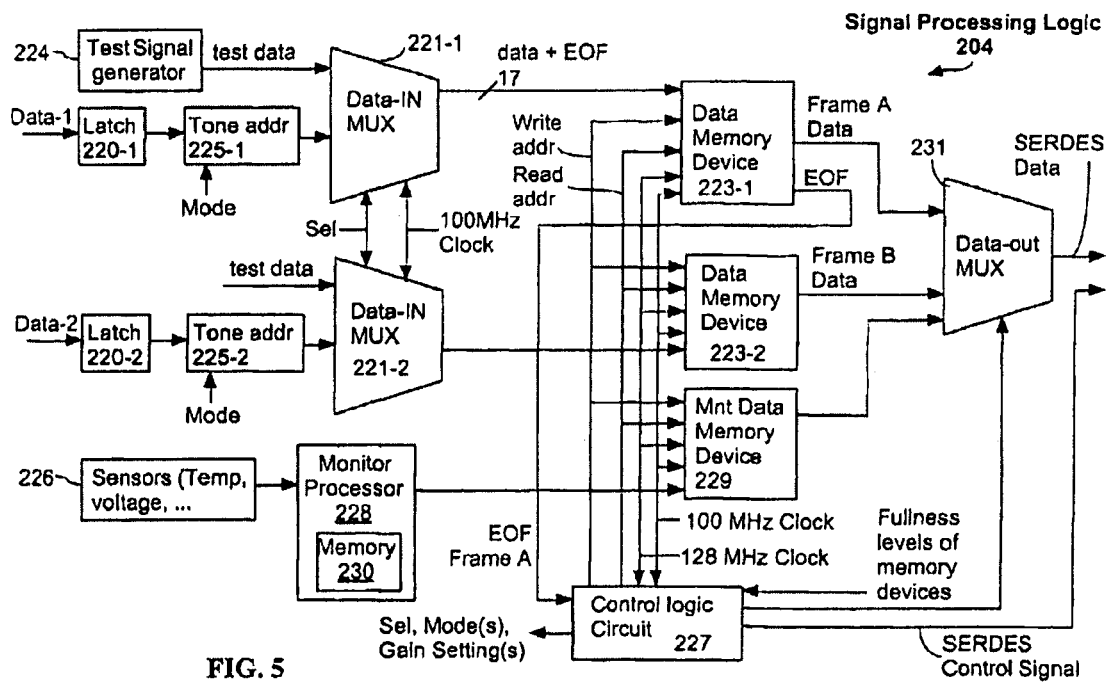

FIG. 5

Signed and Sealed this

Twenty-sixth Day of October, 2010

David J. Kappos
*Director of the United States Patent and Trademark Office*

CERTIFICATE OF CORRECTION (continued)
U.S. Pat. No. 7,257,328 B2

Sheet 7, replace Figure 8 with the figure depicted below, wherein "Test data generator" is renamed "Test signal generator" and Control logic Circuit is relabeled 227-1X

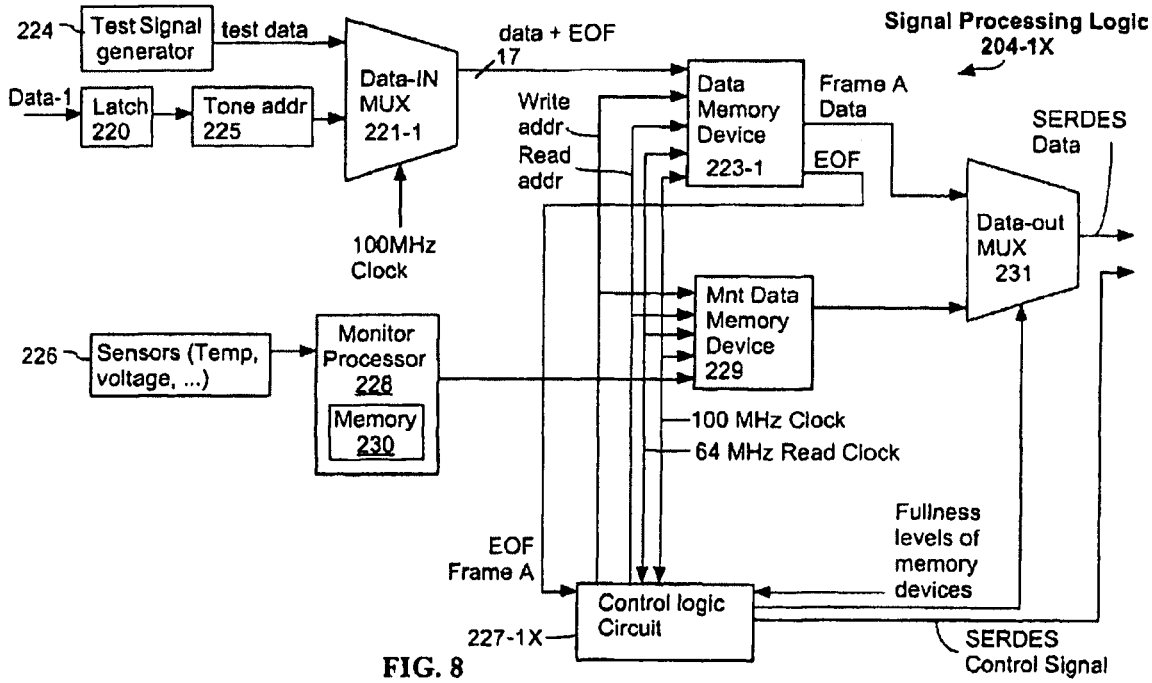

FIG. 8

Sheet 9, replace Figure 10 with the figure depicted below, wherein "Test data generator" is renamed "Test signal generator"

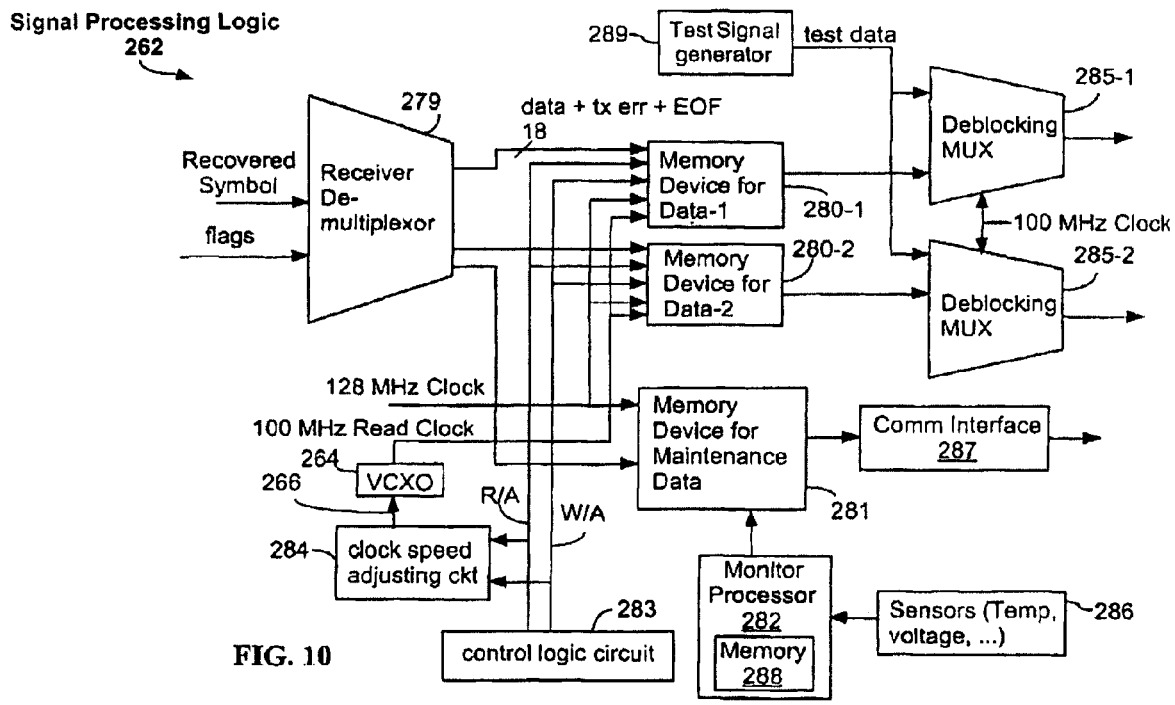

FIG. 10

Sheet 12, replace Figure 13 with the figure depicted below, wherein "Other Service" is renamed "Other Sources"

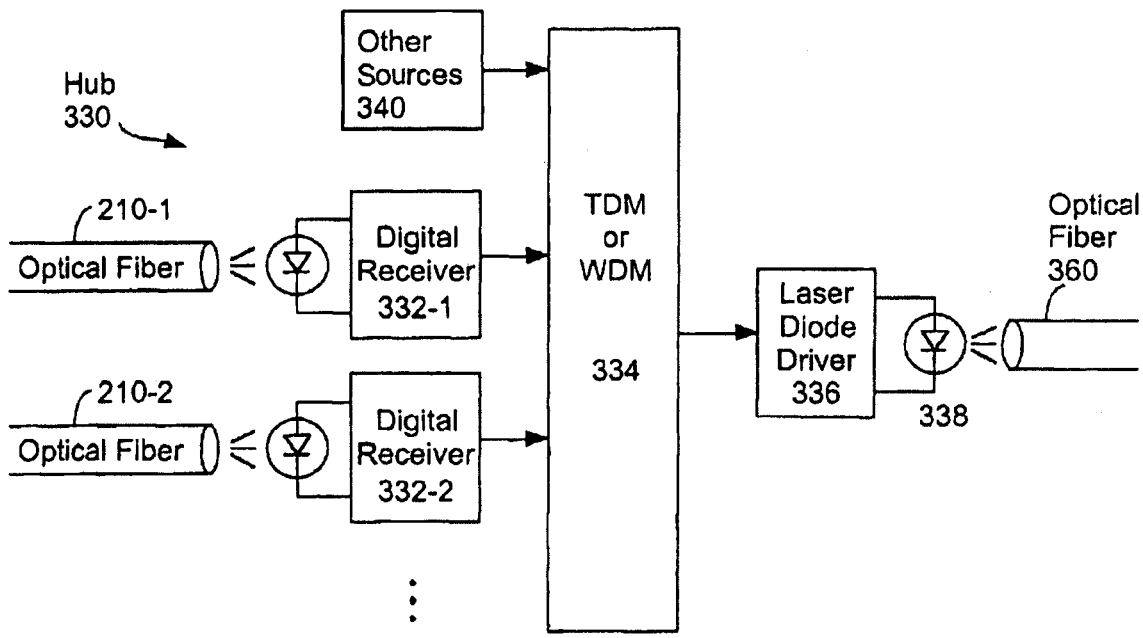

FIG. 13

Column 5
Line 24, after "optical", add [fiber]

Column 7
Line 64, after "ADC 202-1" add [(FIG. 4)]
Line 65, after "ADC 202-2" add [(FIG. 4)]

Column 8
Line 5, change "is" to --are--
Line 41, change "0for" to --0, for--

Column 9
Line 5, after "SERDES 206", add [(FIG. 4)]
Line 6, after "SERDES", add [206 (FIG. 4)]
Line 10, after "200", add [(FIG. 4)]
Line 15, after "200", add [(FIG. 4)]

Column 10
Line 13, after "227", add [(FIG. 5)]
Line 15, after "223-2", add [(FIG. 5)]
Line 19, after "227", add [(FIG. 5)]
Line 49, after "227", add [(FIG. 5)]
Line 53, after "229", add [(FIG. 5)]

Column 10
Line 54, after "227", add [(FIG. 5)]
Line 59, after "229", add [(FIG. 5)]

Column 11
Line 4, after "227", add [(FIG. 5)]
Line 5, after "229", add [(FIG. 5)]
Line 10, after "223", add [(FIG. 5)]
Line 14, after "223", add [(FIG. 5)]
Line 42, after "above,", add [and in reference to FIGS. 4 and 5]
Line 66, after "laser", add [diode]

Column 12
Line 44, change "The receiver 250" to --In FIG. 9, the receiver 250--
Line 51, after "106-2", add [(FIG. 4)]

Column 13
Line 21, after "258", add [(FIG. 9]
Line 44, after "281", add [(FIG. 10]
Line 45, after "280-1", add [(FIG. 10]
Line 47, after "280-1", add [(FIG. 10]
Line 49, after "280-2", add [(FIG. 10]
Line 50, after "280-2", add [(FIG. 10]
Line 66, change "2801" to --280-1--

Column 14
Line 27, after "265", add [(FIG. 9]
Line 29, after "200", add [(FIG. 4]
Line 34, after "250", add [(FIG. 9]
Line 36, after "200", add [(FIG. 4]
Line 44, after "265", add [(FIG. 9]
Line 46, after "200", add [(FIG. 4]
Line 60, after "250", add [(FIG. 9]
Line 63, after "250", add [(FIG. 9]

Column 15
Line 7, after "250", add [(FIG. 9]
Line 21, after "250", add [(FIG. 9]
Line 39, after "250", add [(FIG. 9]
Line 43, change "test generator circuit" to --test signal generator--

Column 16
Line 1, after "223-2", add [(FIG. 5)]
Line 7, change "2021" to --202-1--
Line 8, after "223-2", add [(FIG. 5)]
Line 10, change "2231" to --223-1--
Line 12, change "The receiver 250" to --In FIG. 9, the receiver 250--
Line 13, after "210", add [(FIG. 4)]

Column 16
Line 18, after "280-2", add [(FIG. 10)]
Line 30, after "280-2", add [(FIG. 10)]
Line 40, change "The sample clock" to --Referring back to FIGS. 9 and 10, the sample clock--

Column 17
Line 44, after "(TDM)", add [334]
Line 47, after "202", add [(FIG. 4]

Column 18
Line 7, change "digital signal feeds" to --data feeds--
Line 28, change "314" to --340--
Line 28, change "314" to --340--
Line 34, change "314" to --340--
Line 45, change "service 314" to --sources 340--
Line 46, change "service 314" to --sources 340--
Line 47, change "service 314" to --sources 340--
Line 49, change "service 314" to --sources 340--
Line 50, after "hub", add [330]

Column 21
Line 31, after "402", add [(FIG. 14)]
Line 52, after "404", add [(FIG. 14)]
Line 54, after "404-0", add [(FIG. 14)]
Line 60, after "404-0", add [(FIG. 14)]

Column 23
Line 67, after "203", add [(FIG. 16)]

Column 24
Line 52, change "474" to --474-1--
Line 53, change "474" to --474-1--
Line 54, change "474" to --474-1--
Line 58, change "474" to --474-1--
Line 63, change "474" to --474-1--

Column 25
Line 1, change "474" to --474-1--
Line 4, after "438", add [(FIG. 16)]
Line 5, after "laser", add [diode]
Line 13, change "17" to --16--
Line 45, after "200", add [(FIG. 4)]